(12) United States Patent
Yamashita

(10) Patent No.: US 6,396,943 B2
(45) Date of Patent: *May 28, 2002

(54) DEFECT INSPECTION METHOD AND DEFECT INSPECTION APPARATUS

(75) Inventor: Kyoji Yamashita, Kanagawa-ken (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/158,086

(22) Filed: Sep. 22, 1998

(30) Foreign Application Priority Data

Sep. 22, 1997 (JP) .............................. 9-256847
Jun. 30, 1998 (JP) ........................... 10-185305

(51) Int. Cl.$^7$ .............................. G06K 9/36; G06K 9/62
(52) U.S. Cl. ........................ 382/144; 382/149; 382/151
(58) Field of Search ................................ 382/144, 151, 382/149, 309, 319, 289, 294; 250/559.39, 559.46, 559.2, 559.3, 559.04, 559.05; 348/87, 95, 126; 438/16; 356/237.4, 237.5, 239, 375; 702/40, 150, 159

(56) References Cited

U.S. PATENT DOCUMENTS

| | | | |
|---|---|---|---|
| 4,555,798 A | | 11/1985 | Broadbent, Jr. et al. ......... 382/8 |
| 4,614,430 A | * | 9/1986 | Hara et al. ................... 356/394 |
| 4,628,531 A | * | 12/1986 | Okamoto et al. .............. 382/8 |
| 5,404,410 A | * | 4/1995 | Tojo et al. ..................... 382/50 |
| 5,737,072 A | * | 4/1998 | Emery et al. ................... 356/73 |
| 5,767,974 A | * | 6/1998 | Higashiguchi et al. ...... 365/394 |
| 5,781,657 A | * | 7/1998 | Masuda ....................... 382/147 |
| 5,907,628 A | * | 5/1999 | Yolles et al. ................ 382/149 |
| 5,960,106 A | * | 9/1999 | Tsuchiya et al. ............ 382/144 |

FOREIGN PATENT DOCUMENTS

JP 2675167 7/1997

OTHER PUBLICATIONS

Skinner et al., "Section 5.9.3, Types of Hard Defects" *Handbook of Microlithography, Micromachining and Microfabrication,* vol. 1, pp. 448–449 (1997).
Zurbrick et al., "Fabrication and Evaluation of a Programmed Transmission Defect Test Mask," *SPIE vol. 2087, Proceedings 13tn Annual Symposium on Photomack Technology and Management*, pp. 237–243 (1993).
P. Fiekowsky;, "Accurate and Repeatable Mask Defect Measurement for .25 Micron Technology", SPIE, vol. 3236, pp. 366–371, (1998).
Doi et al., "Principles of Image Signal Processing Theory", *Image Processing Theory,* pp. 163–166 (1980).

\* cited by examiner

*Primary Examiner*—Leo Boudreau
*Assistant Examiner*—Brian P. Werner
(74) *Attorney, Agent, or Firm*—Finnegan, Henderson, Farabow, Garrett & Dunner, L.L.P.

(57) ABSTRACT

A defect inspection method for detecting defects of a pattern formed on a sample. The method has a step of inputting an optical image of the sample as a sensor data, a step of inputting a reference data corresponding to the sensor data, a step of inputting an inspection region data designating a plurality of inspection regions with a rectangular region R including one opening section as the inspection region, a step of extracting the sensor data and the reference data corresponding thereto from a respective one of the inspection regions as designated by the inspection region data and then calculating based thereon a transmission error and relative displacement, and a step of using the resultant transmission error and relative displacement to analyze transmission defects and critical dimension (CD) defects as well as relative displacement defects.

4 Claims, 18 Drawing Sheets

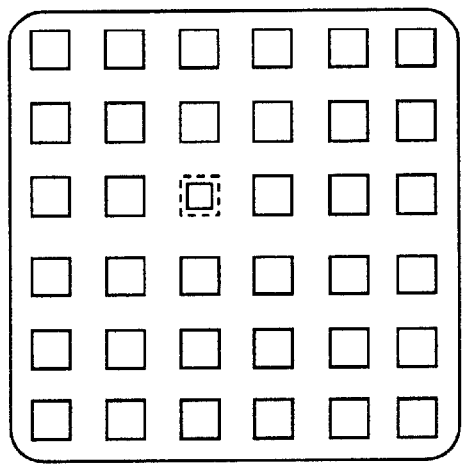
FIG. 4(c) CASE 3: CD DEFECT
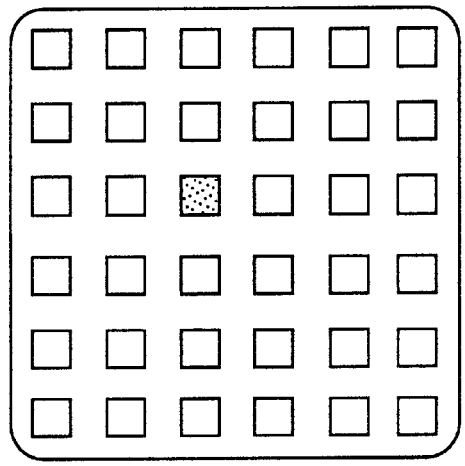
FIG. 4(b) CASE 2: TRANSMISSION DEFECT
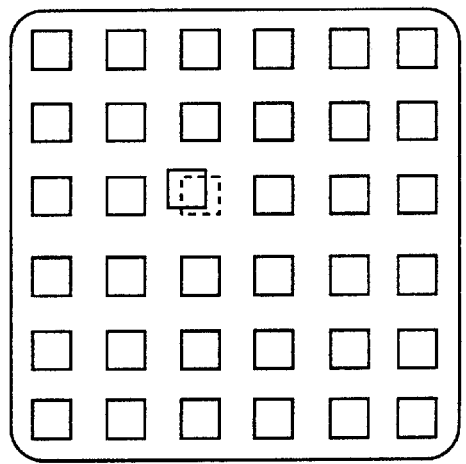
FIG. 4(a) CASE 1: DISPLACEMENT DEFECT

FIG. 10
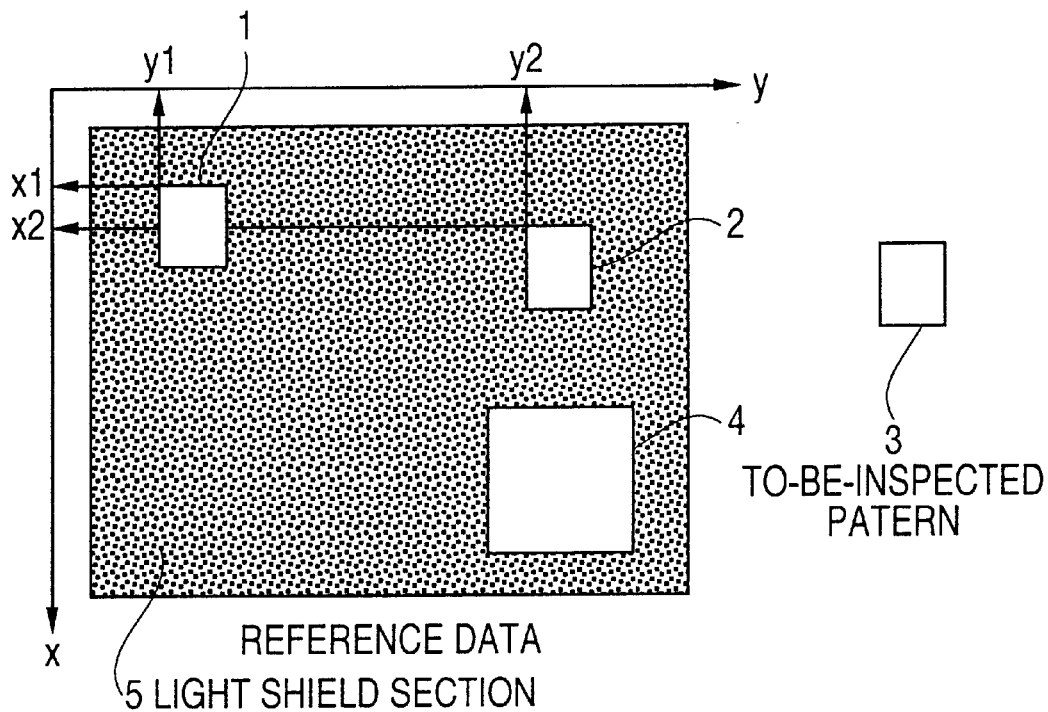
REFERENCE DATA
5 LIGHT SHIELD SECTION
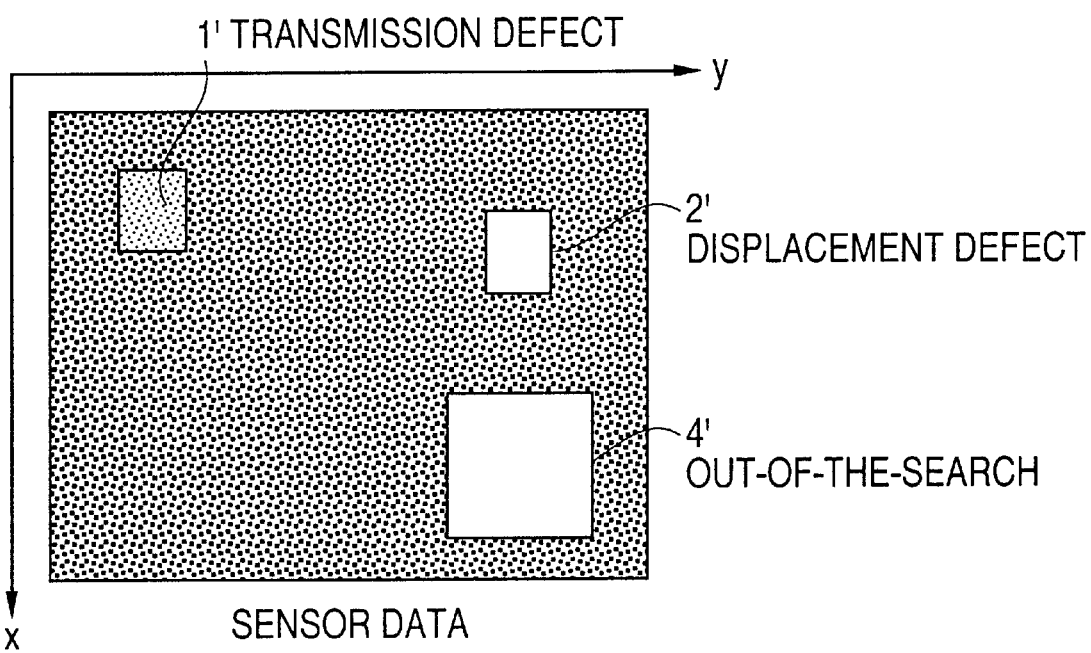
SENSOR DATA

DEFECT INSPECTION METHOD AND DEFECT INSPECTION APPARATUS

BACKGROUND OF THE INVENTION

1. Field of the Invention

The present invention relates to a defect inspection method and defect inspection apparatus, and more particularly to a defect inspection method and defect inspection apparatus employing detection of defect circuit on patterns formed on samples, such as photomasks and reticles used for semiconductor manufacturing as well as liquid crystal display or the like.

2. Discussion of the Background

Semiconductor integrated circuits are manufactured by repeating several process steps of transferring a circuit pattern from a reticle onto a wafer that acts as an original place through reduction exposure of the pattern using ultraviolet rays or deep ultraviolet rays of light.

Present day innovations in performance of DRAMs and MPUs are mostly due to innovations in microfabrication technology of semiconductor integrated circuits. And an advance in the microfabrication technology will be in more need to meet the demands for achieving of a further increase in performance. For example, in regard to the quality of reticles, position accuracy, improve size accuracy, and decrease or eliminate killer defects are becoming more demanding than ever before. As reticle fabrication technology is improved such as circuit pattern drawing transfer techniques, mask process and the like, it will be strictly required that product-test/inspection techniques should be likewise improved to guarantee the final quality of such manufactured reticles.

For detection of defects on the reticles, it is necessary to detect CD (critical dimension) defects of patterns in addition to defects of patterns including pin dots, pinholes and equivalents thereto. For a pattern of contact holes which have rectangular opening sections, detection of defects becomes especially important in view of the fact that these defects can greatly affect the dimension or size of a transferred pattern being formed on a wafer. For example, it is considered that the design role for DRAMs of the 1-gigabit generation will be as small as 150 nm on wafers, that is 600 nm on the quadric magnification (4×) reticles. In this respect, more strict specifications are considered to be required to the extent that the CD error should be less than 20 nm, which will be equivalent to a value of 3% or less after conversion to transmission errors of the openings of contact holes.

The above-mentioned issue is not limited to the contact holes but also holds true of patterns of lines-and-spaces.

Furthermore, since small auxiliary patterns which are used in optical proximity effect correction (OPC) such as jogs, serifs and equivalents thereof are incapable of obtaining the intended optical images with a sufficient resolution, the measurement errors can further increase in case of samples which employ these auxiliary patterns.

As described above, the prior technique is encountered with more difficulty in detecting the CD defects in the patterns of contact holes and lines-and-spaces with high accuracy and sensitivity, as these patterns decrease in size. In addition, for these patterns containing therein small serifs and jogs or the like for effectuation of optical proximity effect correction (OPC), it is becoming more and more difficult to detect their defects with high accuracy and sensitivity.

The present invention has been made in view of the above, and its primary object is to provide a defect inspection method and defect inspection apparatus which is capable of detecting defects accurately and sensitively in a pattern.

SUMMARY OF THE INVENTION

In order to attain the foregoing object, the present invention employs a specific configuration which follows.

In summary, the present invention is directed to a defect inspection method for detecting defects of a pattern formed on a sample, comprising the steps of inputting an optical image of the sample as sensor data, inputting reference data corresponding to the sensor data, calculating a transmission error and a displacement of the sensor data based on the sensor data and the reference data, and analyzing a defect of the sample from the transmission error and the displacement of the sensor data.

In the method, the sensor data can be extracted from inspection regions pursuant to a size and a shape of the pattern, and the reference data can be extracted in accordance with the extracted sensor data. And the analyzed defect can be at least one of the group consisting of a transmission defect, a critical dimension (CD) defect, and a relative displacement defect.

This invention is also directed to a defect inspection method for detecting defects of a pattern formed on a sample, comprising the steps of inputting an optical image of the sample as sensor data inputting reference data corresponding to the sensor data, calculating a first transmission error and a first relative displacement of the sensor data based on the reference data, performing position alignment of the sensor data and the reference data based on the calculated the first relative displacement, calculating a second transmission error and a second relative displacement using the aligned reference data and the aligned sensor data, and analyzing a defect of the sample from the second transmission error and the second displacement of the sensor data.

In the method, the sensor data can be extracted from inspection regions pursuant to a size and a shape of the pattern and the reference data can be extracted in accordance with the extracted sensor data. And the analyzed defect can be at least one of the group consisting of a transmission defect, a critical dimension (CD) defect, and a relative displacement defect.

In the above inventions, a step of inputting inspection region data can be added designating a plurality of inspection regions of the sample in conformity with the size and shape of the pattern. Also, a step of searching for a to-be-inspected pattern with respect to the reference data can be added.

Here, the step of inputting the inspection region data can input a rectangular region including at least one opening section as the inspection region. And the step of inputting the inspection region data can input the inspection region as an array of rectangular regions, a center of gravity of the rectangular region being substantially identical to that of the opening section, and the rectangular region excluding another opening section which is adjacent to the opening section.

Furthermore, if the opening section is a contact hole, and the step of calculating the transmission error and the displacement of the sensor data can include a step of solving the equation:

$$\epsilon \cdot U(x,y) + x0 \cdot dU/dx + y0 \cdot dU/dy = U(x,y) - S(x,y)$$

where $S(x,y)$ is the sensor data at at least three independent coordinates $(x,y)$, $U(x,y)$ is the reference data, $dU/dx$ is an X direction differential value of the reference data, and dU/dy is a Y direction differential value of the reference data, with the transmission error ϵ and the relative displacement x0, y0 being as an unknown quantities. Here, the step of calculating the transmission error and the displacement of the sensor data can include a step of solving the equation using a least square method at those coordinates excluding an area of the rectangular region corresponding to the interior of a light shield section of the sample.

Similarly, if the opening section has lines-and-spaces, and the step of calculating the transmission error and the displacement of the sensor data can include a step of solving the equation:

$$\epsilon \cdot U(x,y) + l0 \cdot dU/dl = U(x,y) - S(x,y)$$

where S(x,y) is the sensor data at at least two independent coordinates (x,y), U(x,y) is the reference data, and dU/dl is a differential value of the reference data in a direction perpendicular to said lines-and-spaces, with the transmission error ϵ and the relative displacement l0 being unknown quantities. Here, the step of calculating the transmission error and the displacement of the sensor data can include a step of solving the equation represented above using a least square method at those coordinates excluding an area of the rectangular region corresponding to the interior of a light shield section of the sample.

The present invention is further directed to a defect inspection apparatus for detecting defects of a pattern formed on a sample, comprising a sensor data memory for storing an optical image of the sample as sensor data, a reference data memory for storing reference data corresponding to the sensor data, a calculator for calculating a transmission error and a displacement of the sensor data based on the sensor data stored in the sensor data memory and the reference data stored in the reference data memory, and a defect analyzer for analyzing a defect of the sample from the transmission error and the displacement calculated by the calculator.

In the apparatus, the sensor data can be extracted from inspection regions pursuant to a size and a shape of the pattern, and the reference data can be extracted in accordance with the extracted sensor data. Also, the defect analyzed by the defect analyzer can be at least one of the group consisting of a transmission defect, a critical dimension (CD) defect, and a relative displacement defect.

BRIEF DESCRIPTION OF THE DRAWINGS

FIGS. 4(a)–4(c) are diagrams showing examples of various kinds of contact hole defects.

FIG. 10 is a diagram explaining principles of a defect inspection.

DETAILED DESCRIPTION OF THE PREFERRED EMBODIMENTS

The present invention will now be described more fully hereinafter with reference to the accompanying drawings, in which some preferred embodiments of the invention are shown.

Figure 1:
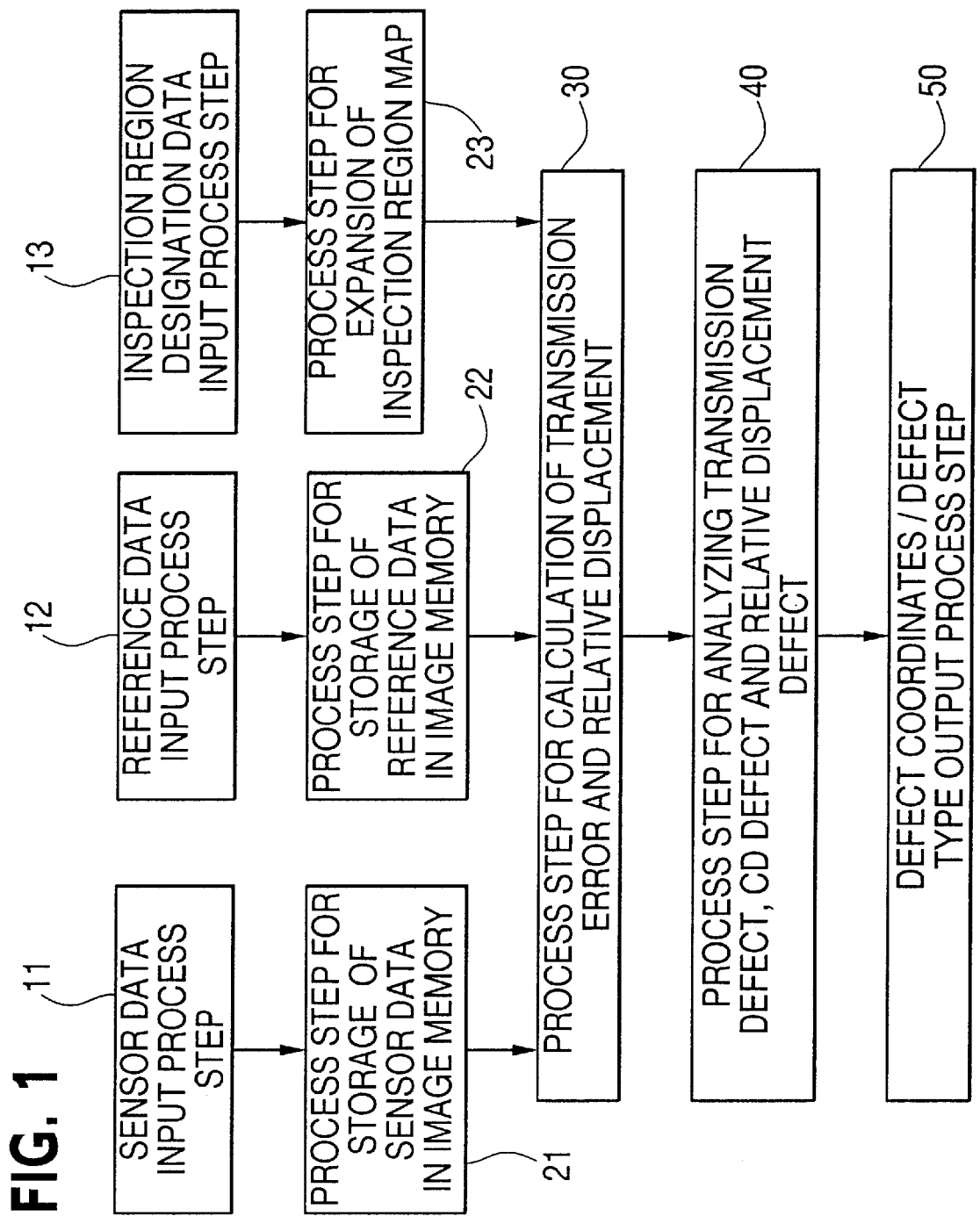
FIG. 1 is a diagram showing a basic operation of a defect inspection method in a block form in accordance with a first embodiment.

FIG. 1 is a diagram showing, in block form, a basic operation of a defect inspection method in accordance with a first embodiment of the present invention.

The first embodiment consists essentially of input process steps 11–13, storage process steps 21, 22, expansion process step 23, calculation process step 30, analyze/judgment process step 40, and output process step 50.

At the input process step 11, an optical image of a specimen or a sample is input as sensor data. At the input process step 12, reference data corresponding to the sensor data is input. Then, at the input process step 13, the data designating an inspection region is input.

Note here that the reference data input at the process step 12 may be either design data corresponding to the sensor data or the sensor data obtainable by detection of the optical image of the sample. In this case, the sensor data is utilized as the reference data, the process step 12 of inputting the reference data will not always be provided independently because such sensor data is to be input at the process step 11. In addition, at the process step 13, an inspection region map with each inspection region mapped is input as inspection region data in order to designate a plurality of inspection regions in accordance with the size and shape of a pattern concerned.

At the storage process step 21 the sensor data is stored in an image memory; at the storage process step 22 the reference data is stored in the image memory. At the expansion process step 23 the inspection region data is used to expand the inspection map. At the calculation process step 30 the sensor data and the reference data contained in each of those inspection regions as designated by the inspection map are taken out or extracted per region to thereby calculate a transmission error and relative displacement by a calculator or a computer. At the analyze process step 40 the resultant transmission error and relative displacement error thus calculated are used to analyze for assessment any possible transmission defects and CD defects as well as relative displacement defects by a defect analyzer. Then, at the output process step 50, the defect coordinates and defect types are output.

Figure 2:
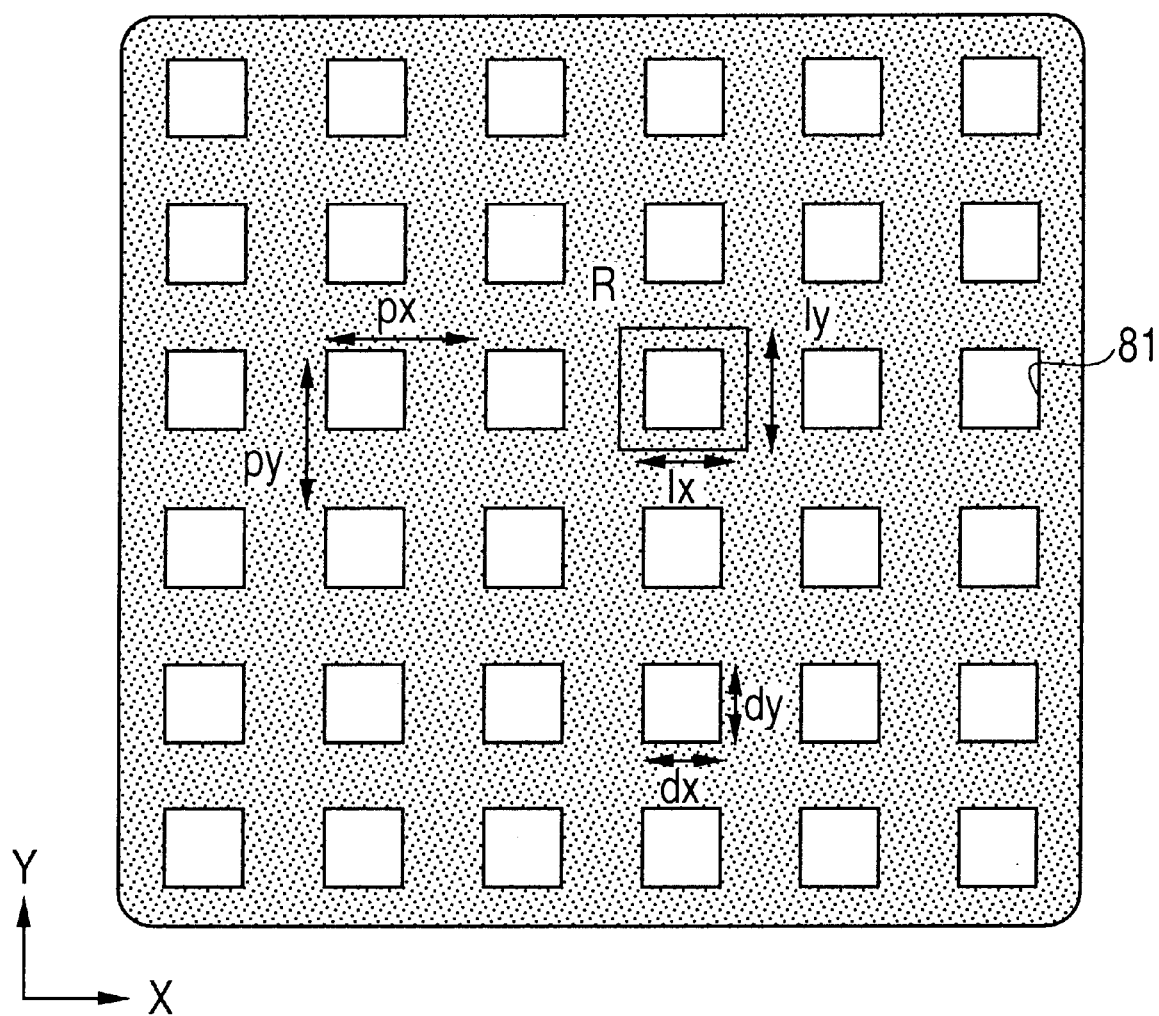
FIG. 2 is a diagram showing a contact hole layout along with a configuration of a rectangular region R versus holes.
Figure 3:
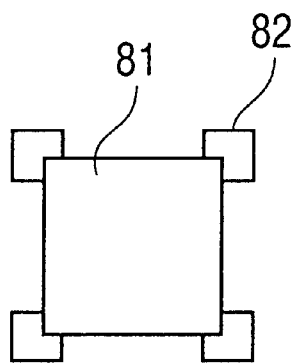
FIG. 3 is a diagram showing an example in which serifs are formed on corners of a contact hole.

As shown in FIG. 2, consider that an inspection is made of a sample having a two-dimensional array of contact holes (opening sections) 81. The shape of contact holes 81 should not however be limited to rectangles. And the contact holes 81 may alternatively be those added with auxiliary patterns for effectuation of optical proximity effect correction (OPC), such as jogs or serifs or the like. One example with serifs 82 formed at the corner of the contact hole 81 is shown in FIG. 3.

Additionally, it is not always required that the contact holes be disposed periodically; and the contact holes should not always be required to be constant in size. Alternatively, a material used as an opaque membrane of a sample on which a circuit pattern will be formed may be those used for a variety of types of phase shift masks, such as molybdenum silicide, other than chromium as employed in most cases.

A rectangular region R is provided which has a size of lx is the X direction and ly in Y direction, wherein the center of gravity of this rectangular region R is substantially identical to that of the contact hole. Here, as the two side lengths lx, ly of a rectangle defining the rectangular region R, a certain one which does not contain any other contact holes adjacent to the rectangular region R is defined. To do this, let the two dimensions of the contact hole be dx in the X direction and dy in-the Y direction while letting the minimum pitch relative to an adjacent contact hole be denoted by px in X direction and py in the Y direction. If this is the case, the two dimensions lx, ly of rectangular region R may be determined as shown in (Equation 7) and (Equation 8) which follow:

$$dx<lx<px \quad \text{(Eq. 7)}$$

$$dy<ly<py \quad \text{(Eq. 8)}$$

With such rectangular region R defined in this way, there will stabilize calculations to be described later. In addition, once only a region or regions are selected with a contact hole, the solution by the calculation enough precision. This makes it possible to greatly reduce the calculation steps as compared to methods of scanning a window of a constant size over the entire image and processing the sensor data and the reference data within such a window to thereby make the intended inspection.

Also, in the case of inspecting the average transmission errors and average relative displacement errors of a plurality of opening sections, in addition to definition of the prescribed rectangular region containing only a single opening section, a rectangular region R containing therein a plurality of opening sections is defined for effectuation of measurements of any possible transmission error and relative displacement error with respect to this region.

Generally, the defect inspection of the mask includes a die-to-die comparison inspection and die-to-database comparison inspection. The former is for comparing two identical sensor images, and the latter is to compare sensor data with design data corresponding thereto. While the former is simpler in apparatus configuration, the latter offers an ability to reliably detect even the common defects of neighboring contact holes so that the die-to-database inspection method account for 50% to 75% of equivalent inspection in the world market nowadays. The present invention is applicable to both the die-to-die inspection method and the die-to-database inspection method.

As the reference data in this embodiment, the sensor data of neighboring mask patterns are used in the die-to-die inspection method, and design data may be used in the die-to-database inspection method. On the other hand, since the die-to-die inspection method is such that both the sensor data and the reference data are captured using the same sensor, a sufficient degree of coincidence of the sensor data and the reference data is obtainable while the defect detection maintains in high sensitivity. The die-to-database inspection method is favorable in that random noise never be produced unlike the sensor data because the reference data is generated from the design data.

A relationship between the sensor data S(x,y) and the reference data U(x,y) is shown in (Equation 9) presented below. Here, (x0, y0) denotes the amount of displacement of the sensor data S(x,y) with respect to the reference data U(x,y), while $\epsilon$ is the transmission error of a sample.

$$S(x,y)=(-1-\epsilon)\cdot U(x-x0, y-y0) \quad \text{(Eq. 9)}$$

In (Equation 9), if (x0, y0) and $\epsilon$ are sufficiently small in value, then the following (Equation 10) is obtained through linear approximation as the approximation formula:

$$\epsilon\cdot U(x,y)+x0\cdot dU/dx+y0\cdot dU/dy=U(x,y)-S(x,y) \quad \text{(Eq. 10)}$$

For the displacement amount (x0, y0) and the transmission error $\epsilon$ which satisfy this (Equation 10), calculation may be done by a method of least square using the sensor data and the reference data of those pixels included in the rectangular region R. If the openings are contact holes, since $\epsilon$, x0 and y0 are unknown quantities, the (Equation 10) may be solved for at least three independent pixel coordinates (x,y). A method of calculation therefor will be explained below.

Input a two-dimensional array of the reference data U(i,j) and the sensor data S(i,j) of a pixel (i,j) that corresponds to the k-th pixel in the rectangular region R. Define w, u by (Equation 11) and (Equation 12) which follow:

$$\{w(k)1,w(k)2,w(k)3\}=\{U(i,j),dU/dx,dU/dy\} \quad \text{(Eq. 11)}$$

$$v(k)-U(i,j)-S(i,j) \quad \text{(Eq. 12)}$$

Further, calculate the X-direction differential value dU/dx and Y-direction differential value dU/dy by use of the following (Equation 13) and (Equation 14):

$$dU/dx=\{U(i+1,j)-U(i-1,j)\}/2 \quad \text{(Eq. 13)}$$

$$dU/dy=\{U(i,j+1)-U(i,j-1)\}/2 \quad \text{(Eq. 14)}$$

It may be determined from said (Equation 10) that if the reference data U(x,y) and the X-direction differential value dU/dx as well as the Y-direction differential value dU/dy are all in close proximity to zero, then the reference data and the sensor data of those pixels residing inside the opaque area of a reticle are negligible because these do not contribute to this calculation. Accordingly, it becomes possible to judge as the opaque area in the case where all the absolute values of the reference data U(i,j) and the X-direction differential value dU/dx plus the Y-direction differential value dU/dy do not exceed an appropriate threshold value.

(Equation 10) is expressed by linear equation systems as represented by the following (Equation 15):

$$Aq=b \qquad (\text{Eq. 15})$$

Here, the variable vector q is defined by (Equation 16) as presented below, the matrix A is defined by the following (Equation 17) and (Equation 18), and the vector b is defined by (Equation 19) and (Equation 20) which follow:

$$q=(\epsilon, x_0, y_0) \qquad (\text{Eq. 16})$$

$$A = \begin{pmatrix} a_{11} & a_{12} & a_{13} \\ a_{21} & a_{22} & a_{23} \\ a_{31} & a_{32} & a_{33} \end{pmatrix} \qquad (\text{Eq. 17})$$

$$a_{ij} = \Sigma w(k)_i \cdot w(k)_j \qquad (\text{Eq. 18})$$

$$b=(b_1,b_2,b_3) \qquad (\text{Eq. 19})$$

$$b_i = \Sigma w(k)_i \cdot v(k) \qquad (\text{Eq. 20})$$

The set of equations represented by (Equation 15) may be solved using the Gauss elimination method, thereby obtaining the displacement amount (x0, y0) and transmission error ϵ. Since this calculation is one of statistical calculations using the least square, there is an advantage that it hardly receives influence due to noise of the sensor data or the like as compared to prior methods such as image edge obtaining methods. Defect judgment may be such that output is done as a defect when the relative displacement amount and transmission error exceed a present threshold.

A result is shown where the above method was applied to relative displacement defects of contact holes and transmission defects as well as CD defects. As indicated in FIG. 2, contact holes may be arranged on a two-dimensional array. In this example, the size of a contact hole has a width of six-pixels. FIGS. 4(a)–4(c) show exemplary cases where the contact hole's relative displacement defects, the transmission defects, and the CD defects are present.

Figure 5A:
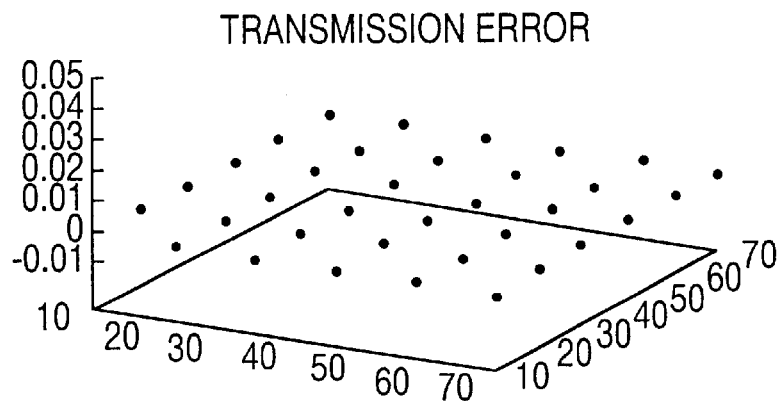
FIGS. 5(a)–5(c) are diagrams showing a distribution of transmission errors upon occurrence of relative displacement error, along with X and Y direction displacement distributions concerned.
Figure 5B:
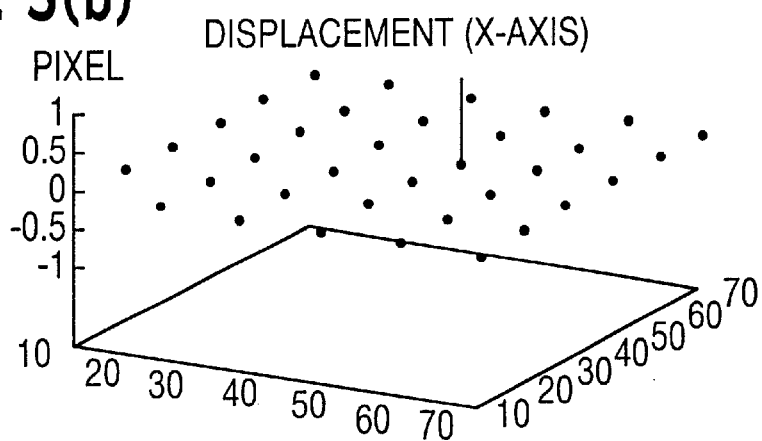
Figure 5C:
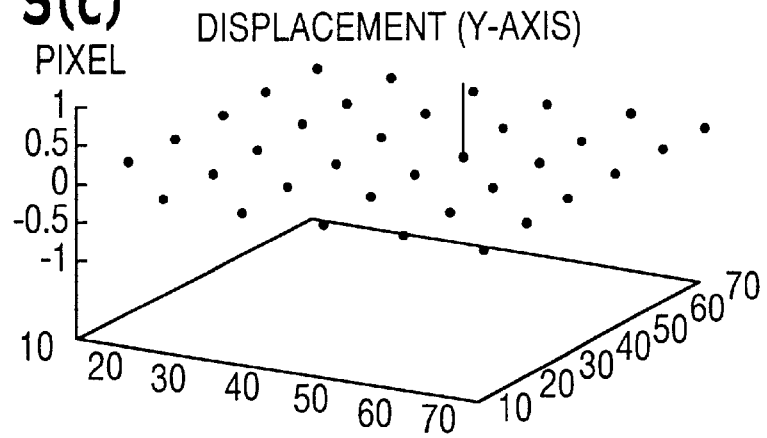

FIG. 4(a) shows a case ("case-1") where the sensor data caused a relative displacement defect with respect to the reference data. This case shows only one central contact hole positionally deviated or offset by a single pixel in the X direction and also by one pixel in the Y-direction. A result in this case is shown in FIGS. 5(a) to 5(c). FIG. 5(a) depicts a distribution of transmission errors, FIG. 5(b) is an X-direction displacement distribution, and FIG. 5(c) is a Y-direction displacement distribution. It would be understood from them that the transmission error distribution is free from the influence of displacement, and also that the X-direction displacement distribution and the Y-direction displacement distribution are obtained correctly.

Figure 6A:
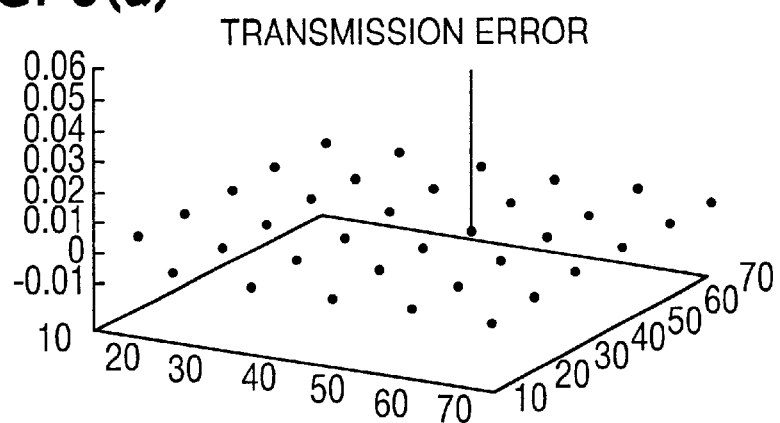
FIGS. 6(a)–6(c) are diagrams showing a distribution of transmission errors upon occurrence of transmission error, along with X and Y direction displacement distributions concerned.
Figure 6B:
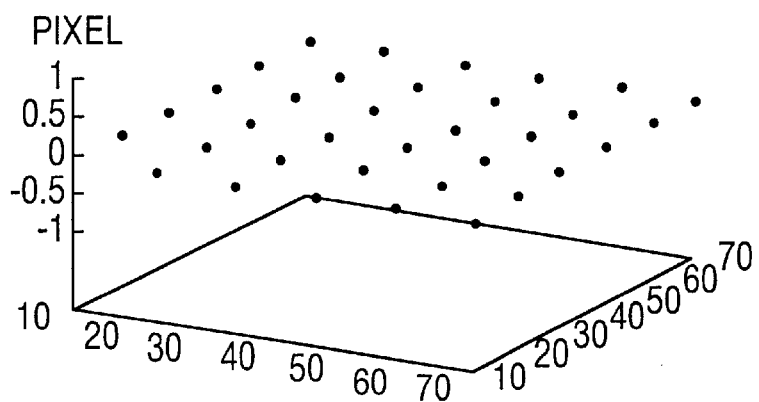
Figure 6C:
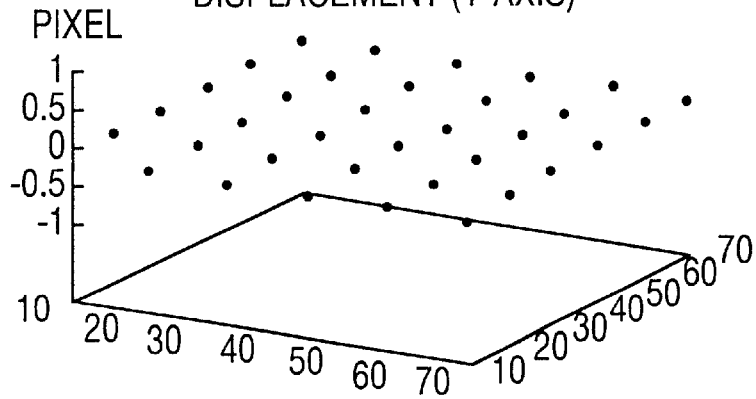

FIG. 4(b) shows a case ("case-2") where a transmission defect was produced. This case shows only one central contact hole with a 5% reduction in transmission. A result in this case is shown in FIGS. 6(a)–6(b). FIG. 6(a) is a distribution of transmission errors, FIG. 6(b) is an X-direction displacement distribution, and FIG. 6(c) is a Y-direction displacement distribution. It would be understood from them that the X-direction displacement distribution and the Y-direction displacement distribution is free from the influences of transmission errors and also that the transmission errors are obtained correctly.

Figure 7A:
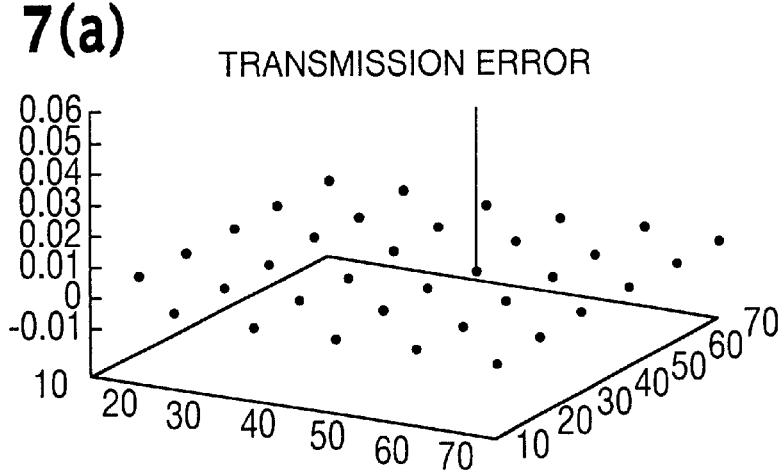
FIGS. 7(a)–7(c) are diagrams showing a distribution of transmission errors upon occurrence of CD (critical dimension) error, along with X and Y direction displacement distributions concerned.
Figure 7B:
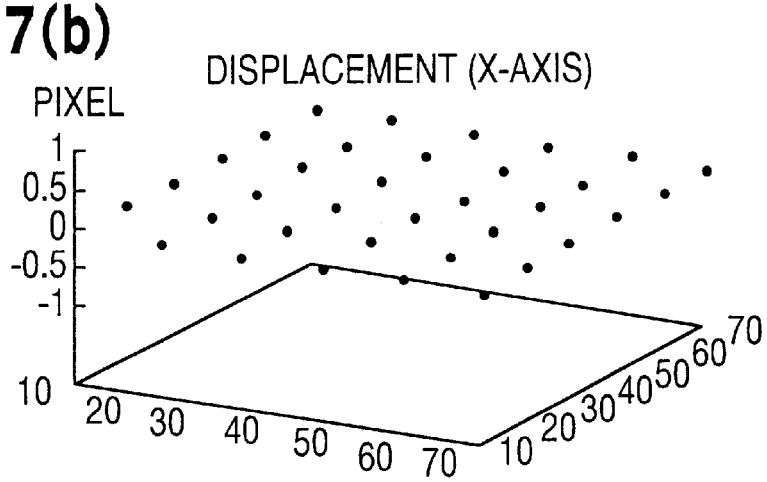
Figure 7C:
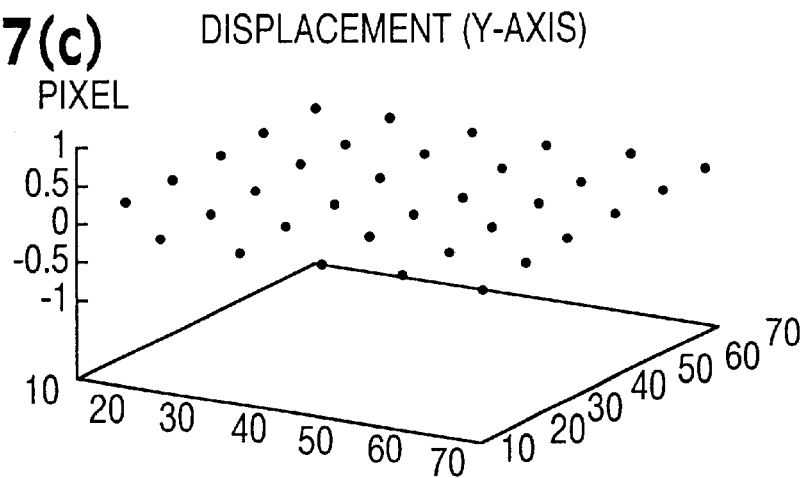
Figure 8:
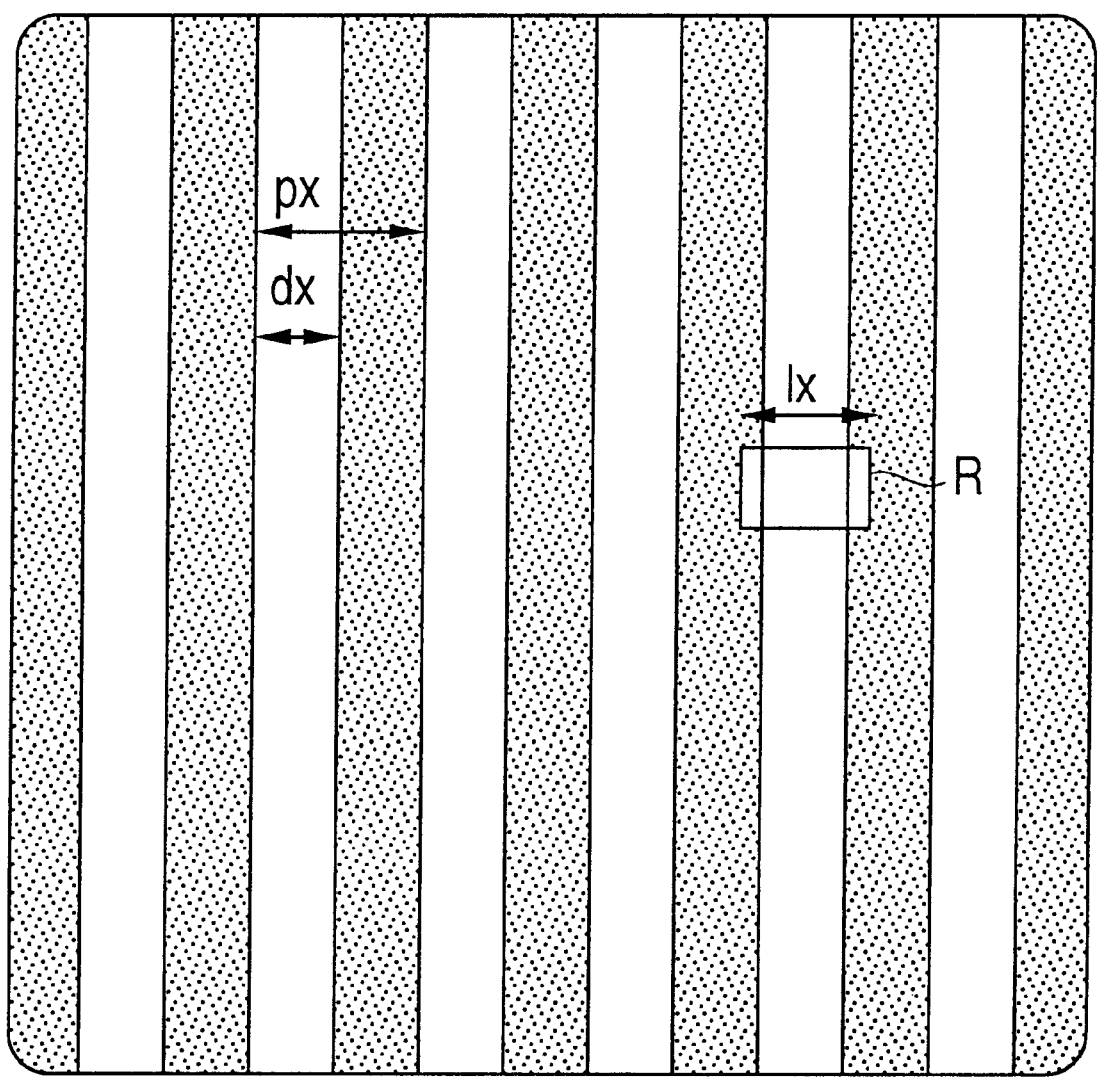
FIG. 8 is a diagram showing lines-and-spaces pattern along with a configuration of a rectangular region R and spaces.

FIG. 4(c) shows a case ("case-3") where a CD defect has produced. This case shows only one central contact hole with a reduction of size (CD) by 0.25 pixel. A result in this case is shown in FIGS. 7(a)–7(c). FIG. 7(a) is a distribution of transmission errors, FIG. 7(b) is an X-direction displacement distribution, and FIG. 7(c) is a Y-direction displacement distribution. It would be understood from them that the CD error can also be detected as a transmission error due to undersized hole.

Then, an explanation will be given of the case of inspecting lines-and-spaces pattern. Here, it is not always required that the lines-and-spaces be constant in size. The generality will not be lost even when the lines-and-spaces pattern extending in the Y direction, consequently, consideration will be taken under this assumption.

In the case of such lines-and-spaces pattern, it is also possible to similarly obtain transmission defects or CD defects and relative displacement defects of a space area represented by an opening section. In this case, it may be considered that while letting the long side of the contact hole explained previously be in the Y direction, this long side is extended. A rectangular region R is provided which has its width of lx in the X direction, wherein the center line of this rectangular region R is almost identical to the center line of the space. With definition of such rectangular region R, the stability of calculation is obtainable. Here, as the length lx of one side of a rectangle defining the rectangular region R, a certain one is defined which does not contain the others adjacent to the rectangular region R. To this end, letting the space width dimension be denoted by dx and the minimum pitch with adjacent line spaces be px, the length lx of said rectangular region R in the X direction may be defined as shown in (Equation 21) below. Alternatively, the Y direction length or size may be set so as to cover either the entire line space or part thereof.

$$dx<lx<px \qquad (\text{Eq. 21})$$

Since the reference data is kept constant in the Y direction, only displacement x0 in the short-side direction (X direction) may be calculated. In other words, said (Equation 10) is replaceable by (Equation 22) which follows:

$$\epsilon \cdot U(x,y)+x0 \cdot dU/dx = U(x,y)-S(x,y) \qquad (\text{Eq. 22})$$

At this time, the opening section is a lines-and-spaces pattern while unknown quantities are ϵ, x0, accordingly, solve (Equation 22) at least two independent coordinates (x, y).

Similarly, define w and v using the following (Equation 23) and (Equation 24):

$$\{w(k)1,w(k)2\}=\{U(i,j),dU/dx\} \qquad (\text{Eq. 23})$$

$$v(k)=U(i,j)-S(i,j) \qquad (\text{Eq. 24})$$

Further, calculate the X direction differential value dU/dx by use of, for example, the following (Equation 25):

$$dU/dx=\{U(i+1,j)-U(i-1,j)\}/2 \qquad (\text{Eq. 25})$$

(Equation 23) is represented by a set of equations as given by the following (Equation 26):

$$Aq=b \qquad (\text{Eq. 26})$$

Here, the variable vector q is defined by (Equation 27) presented below, the matrix A is defined by (Equation 28)

and (Equation 29) below, and the vector b is defined by (Equation 30) and (Equation 31) which follow:

$$q=(\epsilon, x_0) \tag{Eq. 27}$$

$$A = \begin{pmatrix} a_{11} & a_{12} \\ a_{21} & a_{22} \end{pmatrix} \tag{Eq. 28}$$

$$a_{ij} \Sigma w(k)_i \cdot w(k)_j \tag{Eq. 29}$$

$$b=(b_1,b_2) \tag{Eq. 30}$$

$$b_i = \Sigma w(k)_i \cdot v(k) \tag{Eq. 31}$$

The set of equations are solved in a way similar to that in the case of contact holes, thus obtaining the displacement amount x0 and transmission error ε. In this case also, it has been affirmed that the contact holes' relative displacement defect, transmission defect and CD defect were obtained correctly.

In this way, according to the subject embodiment, it is different from the prior technique where the sensor data and the reference data are compared without thinking of any small regions and derive their adjustment condition as a whole. In a way, in the prior technique lacks the inspection method with the conception which the displacement and the transmission errors are individually taken in account.

Practically, it is possible to accurately obtain relative displacement defects and transmission defects plus CD defects of contact holes and/or lines-and-spaces, by setting an inspection region pursuant to a pattern at the rectangular region R, defining the relationship between the sensor data and the reference data as given by (Equation 9) per each rectangular region R, further linear transformating as in (Equation 10) and (Equation 22), and then calculating by the least square the displacement amount (x0, y0) and transmission error ε that satisfy the same. Further, even in the case of a specific pattern that provides fine auxiliary patterns for OPC such as jogs or serifs or the like, no additional problems will occur such as-an increase in error due to calculation results. Thus, it becomes possible to detect, with enhanced accuracy, any defects on contact holes and/or lines-and-spaces on samples, such as photomasks, reticles, liquid crystal substrates, and the like, which have been difficult to detect in the past; for example, it is possible to sufficiently accommodate the defect detection of the devices of the next generation, such as for example 1-Gbit DRAMs or equivalents thereto.

Figure 9:
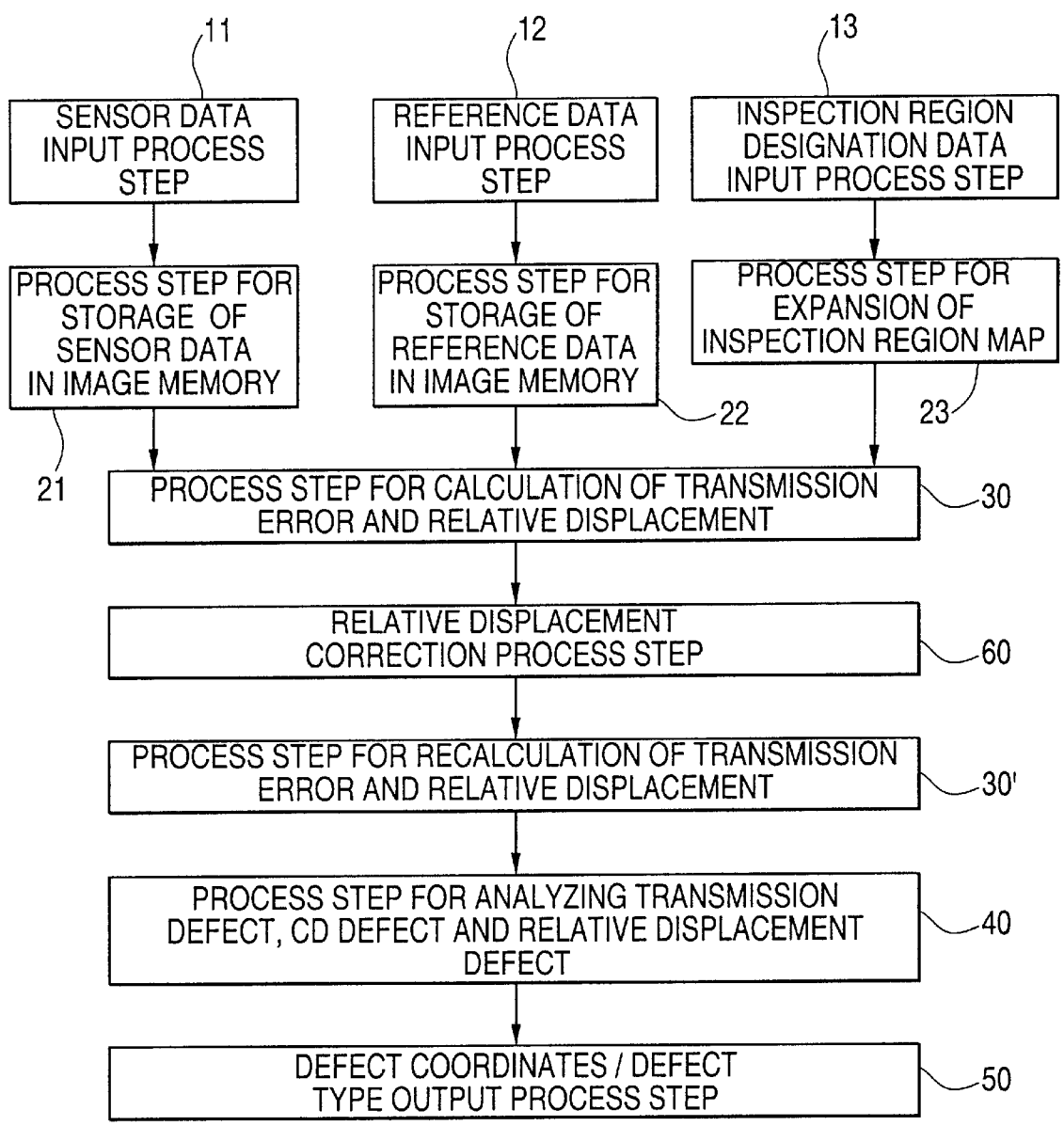
FIG. 9 is a diagram showing a basic operation of a defect inspection method in a block form in accordance with a second embodiment.

FIG. 9 is a diagram showing, in block form, the basic operation of a defect inspection method in accordance with a second embodiment of the present invention. Note that, in each embodiment to be described below, the same reference numbers are added to the same parts as those in FIG. 1, and a detailed explanation thereof will be eliminated herein.

This embodiment is different from the previous embodiment shown in FIG. 1 in that a process step 60 of correcting relative displacement and a process step 30' for re-calculation of transmission errors and relative displacement are carried out between execution of the process step 30 of calculating the transmission error and relative displacement and the process step 40 for judgment of transmission defect and CD defect as well as relative displacement defect.

More specifically, the reference data is subject to position correction in the process step 60, by use of the resultant displacement amount (x0, y0) as obtained by the process step 30; then, the calculation process step 30 for obtaining the displacement amount (x0, y0) and transmission error ε is repeated again in the process step 30'. This makes it possible to further improve the calculation accuracy of transmission error ε.

A first method of such registration may be such that the sensor data S is replaced, for example, with S' shown in the following (Equation 32):

$$S'=(1-x0)\cdot(1-y0)\cdot S(i,j)+x0\cdot(1-y0)\cdot S(i+x0,j)+(1-x0)\cdot y0\cdot S(i,j+y0)+ x0\cdot y0\cdot S(i+x0,j+y0) \tag{Eq. 32}$$

Alternatively, a second method of registration is such that the reference data U, dU/dx, dU/dy are replaced by U', dU'/dx, and dU'/dy, for example, as shown in (Equation 33), (Equation 34) and (Equation 35) which follow:

$$U'=(1-x0)\cdot(1y0)\cdot U(i,j)+x0\cdot(1-y0)\cdot U(i-x0j)+(1-x0)\cdot y0\cdot U(i,j-y0)+ x0\cdot y0\cdot U(i-x0,j-y0) \tag{Eq. 33}$$

$$dU'/dx=-\{U(i+l,j)+U(i-l,j)-2U(i,j)\cdot x0+(U(i+l,j)-U(i-l,j)\}/2 \tag{Eq. 34}$$

$$dU'/dy=-\{U(i+l,j)+U(i,l-j)-2U(i,j)\cdot y0+\{U(i+l,j)-U(i-l,j)\}/2(i,j+l)- U(i,j-l) \tag{Eq. 35}$$

As described above, the former method of registration only requires mere correction of S. On the contrary, the latter method of position correction requires calculation of three units U, dU/dx, and dU/dy. Hence, the former method will be advantageous upon execution of actual calculations. Registration of the patterns of lines-and-spaces may also be achieved in the same way as that stated supra.

A third embodiment of the present invention will be explained below. As has been explained previously, the illustrative embodiment is also applicable to any one of the die-to-die inspection method and the die-to-database inspection method.

In conjunction with FIG. 10, an explanation will be given of the principles of the defect inspection method in accordance with the present invention. First, search for, in the reference data, one or ones that are identical to a pattern 3 to be inspected. For example, reference data 1 and reference data 2 are such examples. Then, output the x-y coordinates of a pattern that matches the to-be-inspected pattern. By way of example, find the coordinates (x1, y1) with respect to the reference data 1, and the coordinates (x2, y2) for the reference data 2.

It is possible to extract from the output x-y coordinates certain sensor data corresponding to the reference data. FIG. 10 shows the reference data 1 and the sensor data 1'that correspond to transmission defects along with the reference data 2 and the sensor data 2' corresponding to displacement defects. Thus, any pattern different in size and shape, such as reference data 4, will be excluded from the objects to be searched. However, it will be possible, even in such case also, to make the intended inspection when comprising a plurality of types of templates as reference data, means for calculating the transmission error and relative displacement in accordance with the type of a template selected, and means for analyzing those defects, such as the transmission defect, relative displacement defect in a way pursuant to the type of the template.

In order to perform the inspection of transmission errors and displacement, a reference pattern defining the standard is pre-input for calculation of the average transmission error and relative displacement of the sensor data with respect to this standard reference pattern.

This reference pattern may also be replaced by certain sensor data permitted as a good quality as the representative, or alternatively, the pattern may also be generated from the design data. With the former method, since both the sensor data and the templates are the data as obtained by the same sensor, a sufficient coincidence is obtainable for use with the profile of an image so that the detection accuracy is high; however, the latter method is advantageous in that little noise is applied unlike the sensor data because the templates are generated from the design data.

A calculation method applied to patterns represented by a contact hole will be explained. A relation between the sensor data $S(x,y)$ and the reference data $U(x,y)$ is given by (Equation 9) presented above. Assuming that displacement amount (x0, y0) and transmission error $\epsilon$ are sufficiently small, said (Equation 10) is obtainable as an approximate equation through linear transformation processing. For the displacement amount (x0, y0) and transmission error $\epsilon$ satisfying this (Equation 10), calculation is done by the method of the least square using the sensor data and the reference data of those pixels as contained in the to-be-inspected pattern region. Similarly, for patterns represented by lines-and-spaces, letting $\theta$ denote the lines-and-spaces' angle relative to the y-axis, the following equation is obtained:

$$u(x, y) = u(l) \quad \text{(Eq. 36)}$$
$$= u(x\cos\theta + y\sin\theta)$$

The differential value in a direction perpendicular to the lines-and-spaces is at $dU/dl$ as shown in (Equation 37), whereas the transmission error $\epsilon$ and relative displacement in the direction perpendicular to the lines-and-spaces is at $l0$ as given by (Equation 38) which follows:

$$dU/dl = dU/dx \cdot \cos\theta + dU/dy \cdot \sin\theta \quad \text{(Eq. 37)}$$
$$l0 = x0 \cos\theta + y0 \sin\theta \quad \text{(Eq. 38)}$$

Therefore, the following (Equation 39) may be calculated:

$$\epsilon \cdot U(x,y) + l0 \cdot dU/dl = U(x,y) - S(x,y) \quad \text{(Eq. 39)}$$

Note that the practical calculation method of the average transmission error and the relative displacement may be the same as that of first embodiment previously explained.

Figure 11:
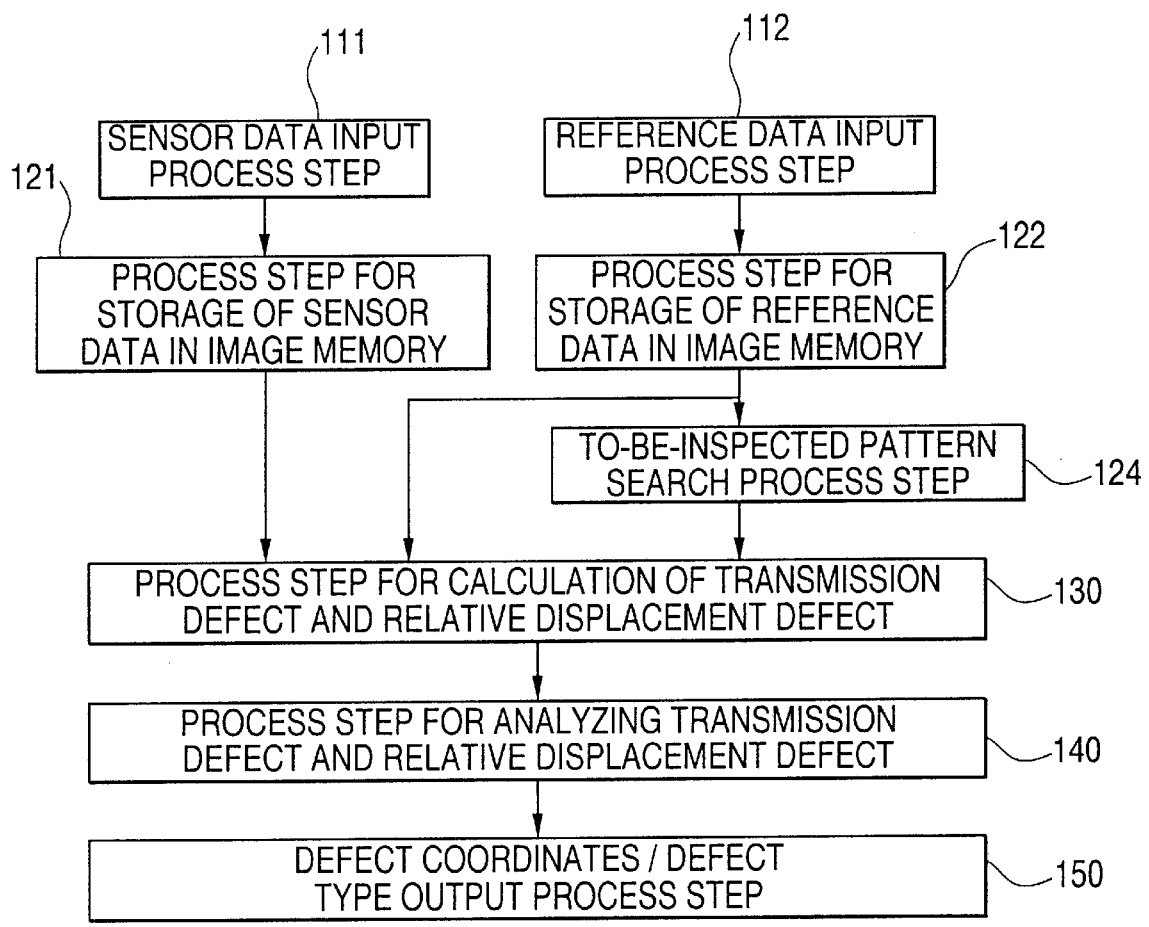
FIG. 11 is a diagram showing one basic operation of a defect inspection method in a block form in accordance with a third embodiment.

FIG. 11 is a first configuration example shown in block form the fundamental operation of a defect inspection method in accordance with this embodiment. It consists essentially of data input process steps 111, 112, data storage process steps 121, 122, search process step 124, calculation process step 130, analyze/judgment process step 140, and output process step 150.

At the data input process step 111, an optical sensor is used to sense an optical image of a sample, which is then input as sensor data. At data input process step 112, input the reference data corresponding to the sensor data. At data storage process step 121, the sensor data is stored in an image memory; at data storage process step 122 the reference data is stored in the image memory. At search process step 124, the reference data is input from the image memory for effectuation of a pattern matching with the to-be-inspected pattern being inspected. If a match is found, the search process step 124 then obtains the position of the to-be-inspected pattern.

At the calculation process step 130, input the position of this to-be-inspected pattern, then extract from the sensor data corresponding to the reference data a region corresponding to this to-be-inspected pattern to thereby calculate the average transmission error and relative displacement. At judgment process step 140, determine whether the average transmission error and relative displacement are out of a predetermined permission range. If so, then judge that there must be a defect. At output process step 150, derive the coordinates including the defect along with a defect kind.

Figure 12:
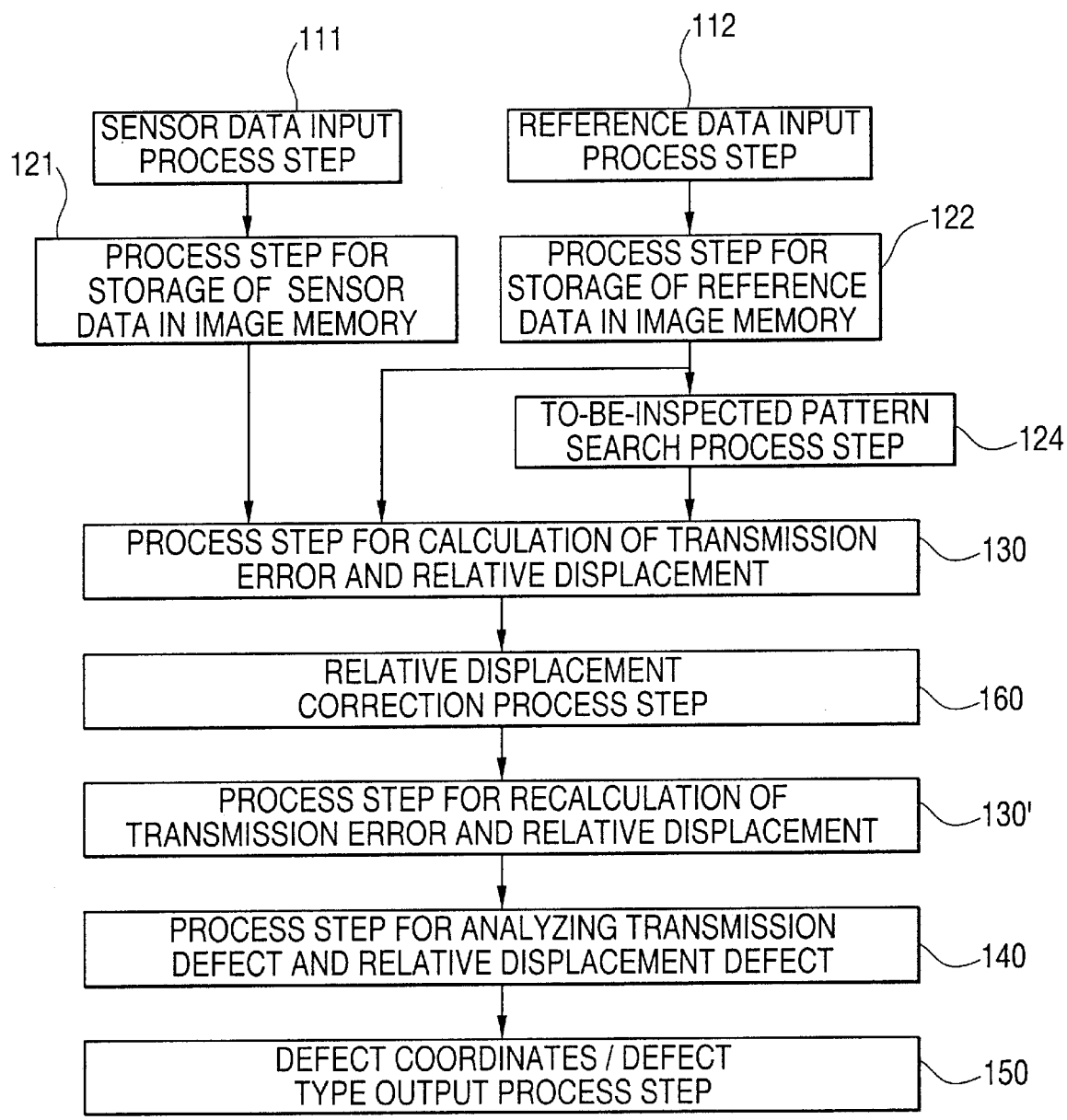
FIG. 12 is a diagram showing another basic operation of a defect inspection method in a block form in accordance with a third embodiment.

FIG. 12 is a second configuration example which shows in block form the fundamental operation of a defect inspection method in accordance with the subject embodiment. This example is similar in principle to that of FIG. 11. A difference of it from FIG. 11 is that a position correction process step 160 and a re-calculation process step 130' are carried out between the re-calculation process step 130 and the judgment process step 140.

In this example, the displacement amount (x0, y0) and transmission error $\epsilon$ are re-calculated after registration of the sensor data by using a pre-calculated relative displacement. Whereby, the pre-calculation makes it possible to further improve the calculation accuracy of transmission error $\epsilon$. Note here that the registration process step 160 and the re-calculation process step 130' will be unnecessary if the resultant displacement amount is sufficiently small. Additionally, omitting the position correction process step 160 and re-calculation process step 130' makes it possible to reduce the inspection time.

Figure 13:
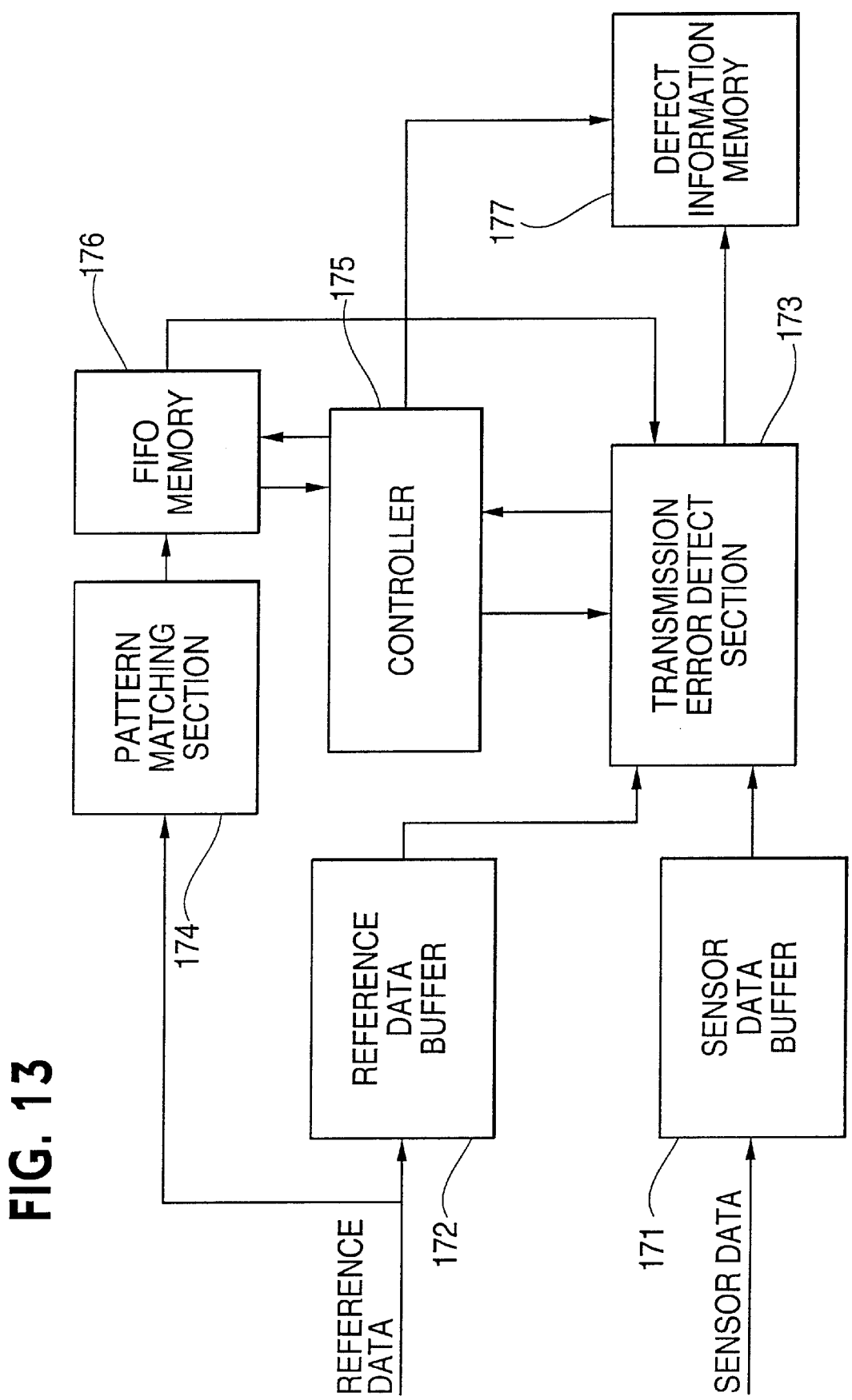
FIG. 13 is a diagram showing a circuit configuration of a defect inspection apparatus.

FIG. 13 is a block diagram showing a circuit configuration of a defect inspection apparatus in accordance with the present invention. This apparatus shown includes a sensor data buffer (memory) 171, a reference data buffer (memory) 172, a transmission defect detect section 173, a pattern matching section 174, a controller 175, a first-in/first-out (FIFO) memory 176, and a defect information memory 177.

The sensor data buffer 171 pre-stores the sensor data therein, and the reference data buffer 172 pre-stores the reference data corresponding to the sensor data. The pattern matching section 174 inputs the reference data for pattern matching of the data with a to-be-inspected pattern to thereby make a search for determining whether a pattern identical to the to-be-inspected pattern is present on the plane of an image. And if so then attempts to write into the FIFO memory 176 position information indicating where such pattern locates. The controller 175 monitors whether the coordinates have been written into the FIFO memory 176, and if the coordinates were written then the controller 175 passes such coordinates to the transmission defect detect section 173.

The transmission defect detect section 173 uses a barrel shifter, as will be later described, to extract from the sensor data buffer 171 a certain region that corresponds to the to-be-inspected pattern. Simultaneously, the transmission defect detect section 173 also extracts from the reference data buffer 172 a specific region corresponding to the to-be-inspected pattern by using the barrel shifter, and then makes use of both the sensor data and the reference data to perform calculations of transmission error and displacement. Then, the apparatus determines whether there is a defect or not based on the transmission error and displacement thus calculated. In the case it was judged as a defect, the apparatus writes into the defect information memory 177 the defect coordinates and defect category and the like.

The pattern matching methods include one approach using the total sum of difference absolute values, and another approach employing one or more matching filters. Details of the pattern matching using such matching filters has been disclosed, for example, in a publication ("Principles of Image Signal Processing" by Doi and Ando, at pp. 163–166).

During the candidate selection in the pattern matching section 174, it is considered that the pixel coordinates are output to the FIFO memory 176 as the position of a to-be-inspected pattern when a first case and a second case are both established: the first case is that an output of a matching filter with respect to said template with each pixel being as a center has exceeded a given threshold; the second case is that the matching filter's output is maximized within a 3×3 pixel area near the center pixel. With such an arrangement, it is possible to detect only those candidates that are maximally identical to the to-be-inspected pattern, which in turn enables achievement of efficient inspection. Additionally, for lines-and-spaces patterns, a specific one may be selected from among the 3×3 pixels near or around the center pixel, which is maximal relative to only those pixels in a direction perpendicular to the lines-and-spaces.

Figure 14:
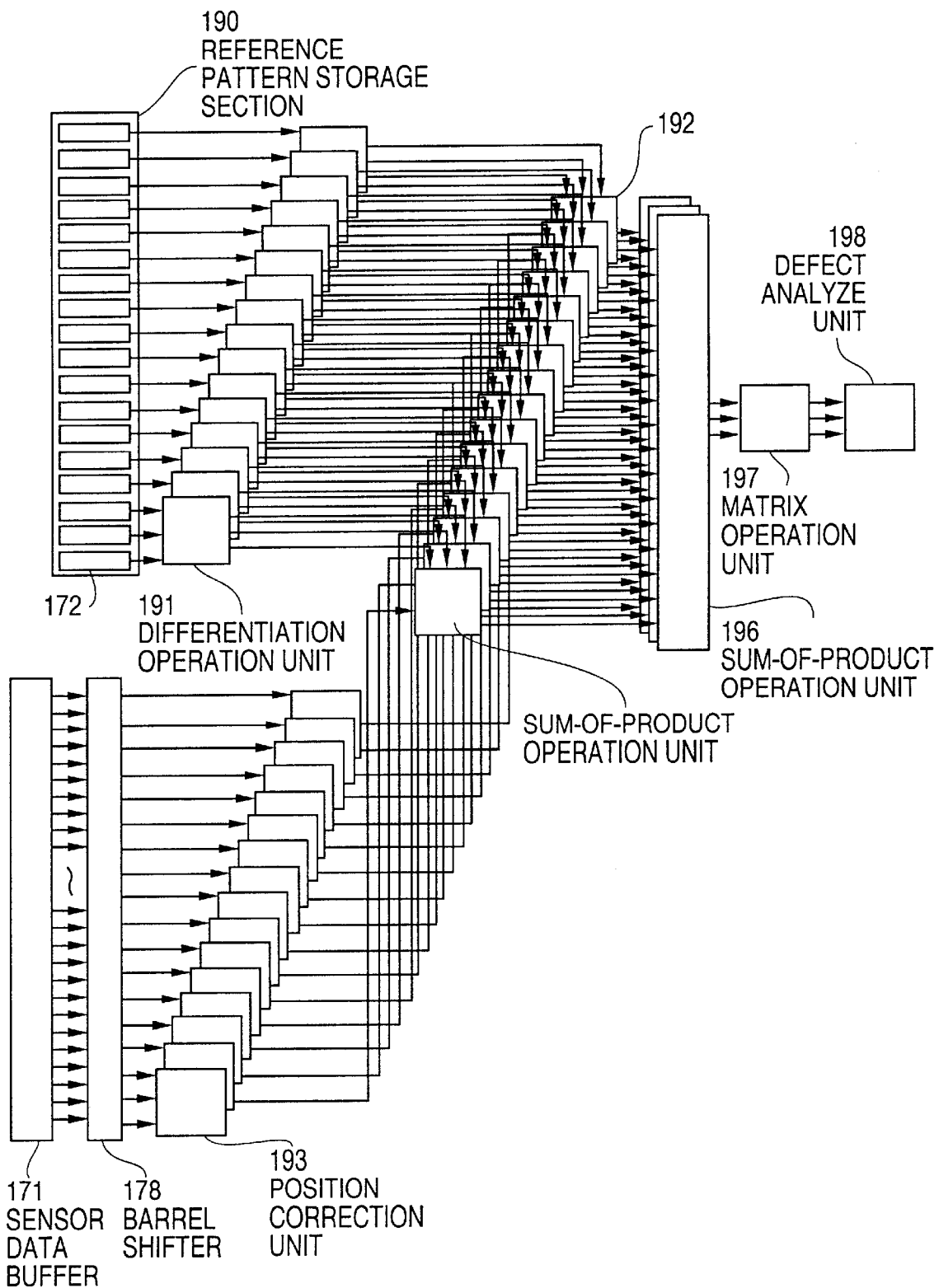
FIG. 14 is a diagram showing a first configuration example of a transmission defect detecting section.

FIG. 14 shows a first configuration example of the transmission defect detector section. This detector includes a reference pattern storage section 190, a differentiation operation unit 191, a sum-of-product operation unit 192, a position corrector section 193, a sum-of-product operation unit 196, a matrix operation unit 197, and a defect analyzer/judgment unit 198. Use the barrel shifter 178 to extract a region corresponding to the to-be-inspected pattern from the sensor data buffer 171, then give it to the position corrector section 193. The reference pattern storage section 190 includes the reference data buffer 172, wherein a region corresponding to the to-be-inspected pattern is extracted using the barrel shifter from the reference data buffer 172, and is then given to the differentiation operation unit 191.

The size of a region to be stored in the template may be provided such that it is greater than a size of the to-be-inspected pattern as divided by a pixel pitch. In this example, there is shown the case of calculating the to-be-inspected pattern's transmission error and displacement amount being contained in a region of 16×16 pixels at most. In order to implement spatial differentiation, the reference pattern is required to store therein an image of 18×18 pixels. Also, the sensor data is required to be such that an image of 18×18 pixels is extracted for position correction as will be described later.

Figure 15:
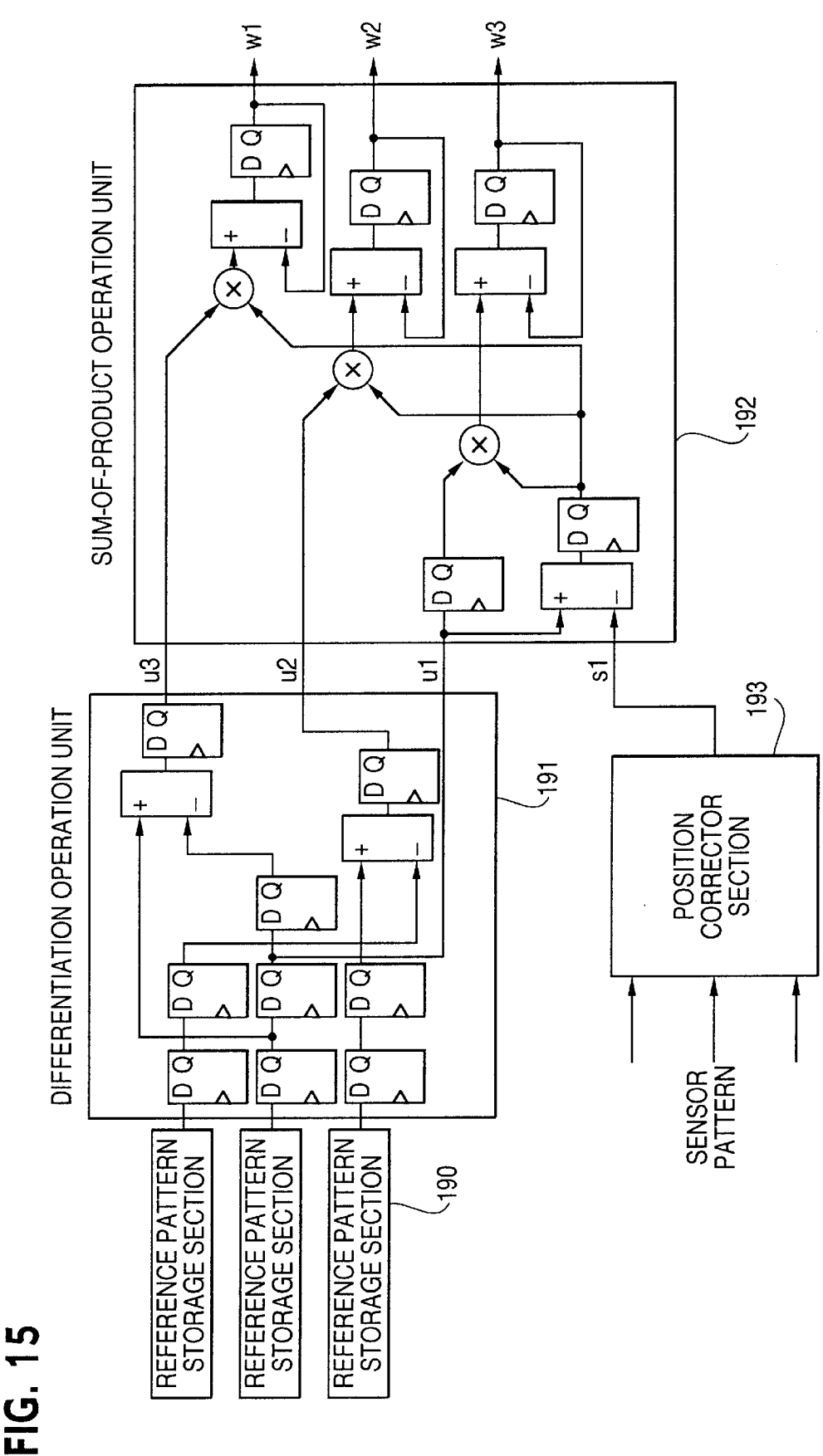
FIG. 15 is a diagram showing a schematic configuration example of a differentiation operation unit and a sum-of-product operation unit.

FIG. 15 shows one practical configuration example of the differentiation operation unit 191 and sum-of-product operation unit 192. The reference pattern storage section 190 pre-stores therein a reference pattern per each line, which pattern becomes the standard. The differentiation operation unit 191 inputs more than one reference pattern that is read out simultaneously with the sensor data buffer to thereby calculate a variable density or "gray-scale" value u1 of interest and spatial differentiation u2 in the X direction along with spatial differentiation u3 in the Y direction. The registration section 193 performs correction by applying a two-dimensional finite impulse response filter (FIR) to the sensor data. A filter coefficient is set in accordance with the displacement.

The sum-of-product operation unit 192 inputs the differentiation circuit 191 and the position-corrected sensor data s1, and calculates by pipe-line processing the sum-of-product values w1, w2, w3 relative to u1, u2, u3 for (u1–s1), respectively. And, the sum-of-product operation unit 196 obtains the total sum values w'1, w'2, w'3 of the aforesaid sum-of-product arithmetic operations as executed on each line as shown in the following:

$$\begin{pmatrix} w_1^1 \\ w_2^1 \\ w_3^1 \end{pmatrix} = A \begin{pmatrix} \sum u_1(u_1 - s_1) \\ \sum u_2(u_2 - s_2) \\ \sum u_3(u_1 - s_3) \end{pmatrix} \quad \text{(Eq. 40)}$$

$$\begin{pmatrix} v_1 \\ v_2 \\ v_3 \end{pmatrix} = A \begin{pmatrix} w_1^1 \\ w_2^1 \\ w_3^1 \end{pmatrix} \quad \text{(Eq. 41)}$$

$$A = \begin{pmatrix} \sum u_1^2 & \sum u_1 u_2 & \sum u_1 u_3 \\ \sum u_2 u_1 & \sum u_2^2 & \sum u_2 u_3 \\ \sum u_3 u_1 & \sum u_3 u_2 & \sum u_3^2 \end{pmatrix} \quad \text{(Eq. 42)}$$

The matrix operation unit 197 multiplies w'1, w'2, w'3 by the 3×3 matrix A to obtain v1, v2, v3 as shown in (Equation 41). Each of v1, v2, v3 is the transmission error ϵ and displacement amount x0, y0. The matrix A is the inverse matrix of a cross-correlative matrix of u1, u2, u3 as indicated in (Equation 42). In cases where such high-speed processing is required, this inverse matrix is to be calculated in advance. In the case of inspecting a plurality of patterns with different shapes and sizes of the to-be-inspected pattern, a memory or memories may be prepared which stores therein such inverse matrices corresponding to respective ones.

Figure 16:
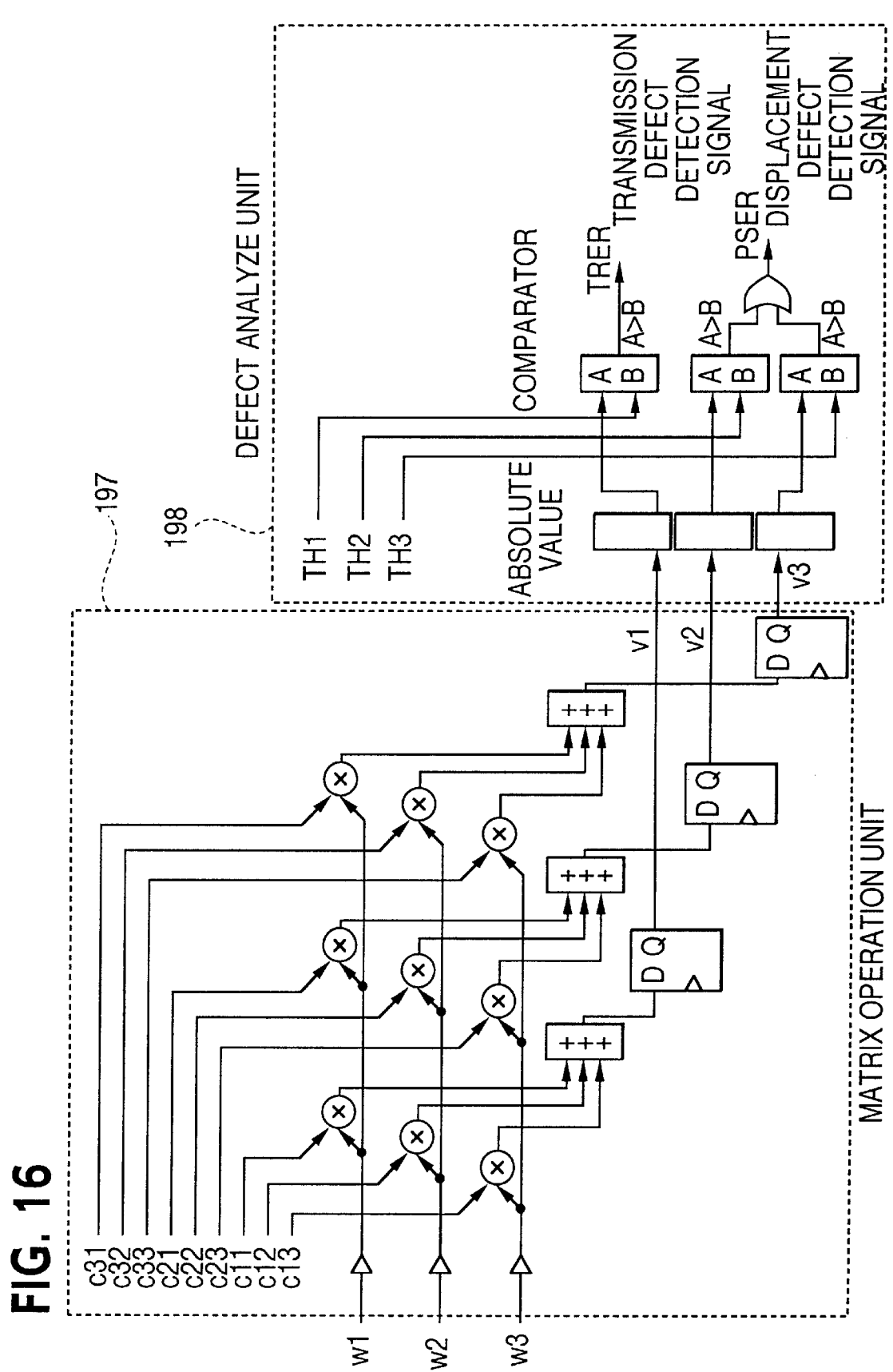
FIG. 16 is a diagram showing a schematic circuit configuration of a matrix operation unit and a defect analyzer unit.

The defect analyzer unit 198 operates to determine whether a defect is present or absent based on whether the absolute value of u1, u2, u3 are large or small. A practical circuit configuration of the matrix operation unit 197 and defect analyze unit 198 is shown in FIG. 16. As described previously, it is possible to improve the transmission error calculation accuracy by recalculating through position correction the sensor data by use of once-calculated relative displacement (x0, y0). In addition, since the position correction is achieved by obtaining the sensor data of the coordinates (i, j) as shown in (Equation 43) presented below, let the coefficient ac xy of FIR of the position corrector section 193 be variable with the relative displacement (x0, y0) with respect to the sensor data of the 3×3 region with this pixel being as a center:

$$s'(i,j) = \Sigma a x y s(i-x, j-y) \quad \text{(Eq. 43)}$$

The above circuit is also applicable, by appropriately setting the matrix A, to not only the patterns like contact holes but also lines-and-spaces patterns.

Figure 17:
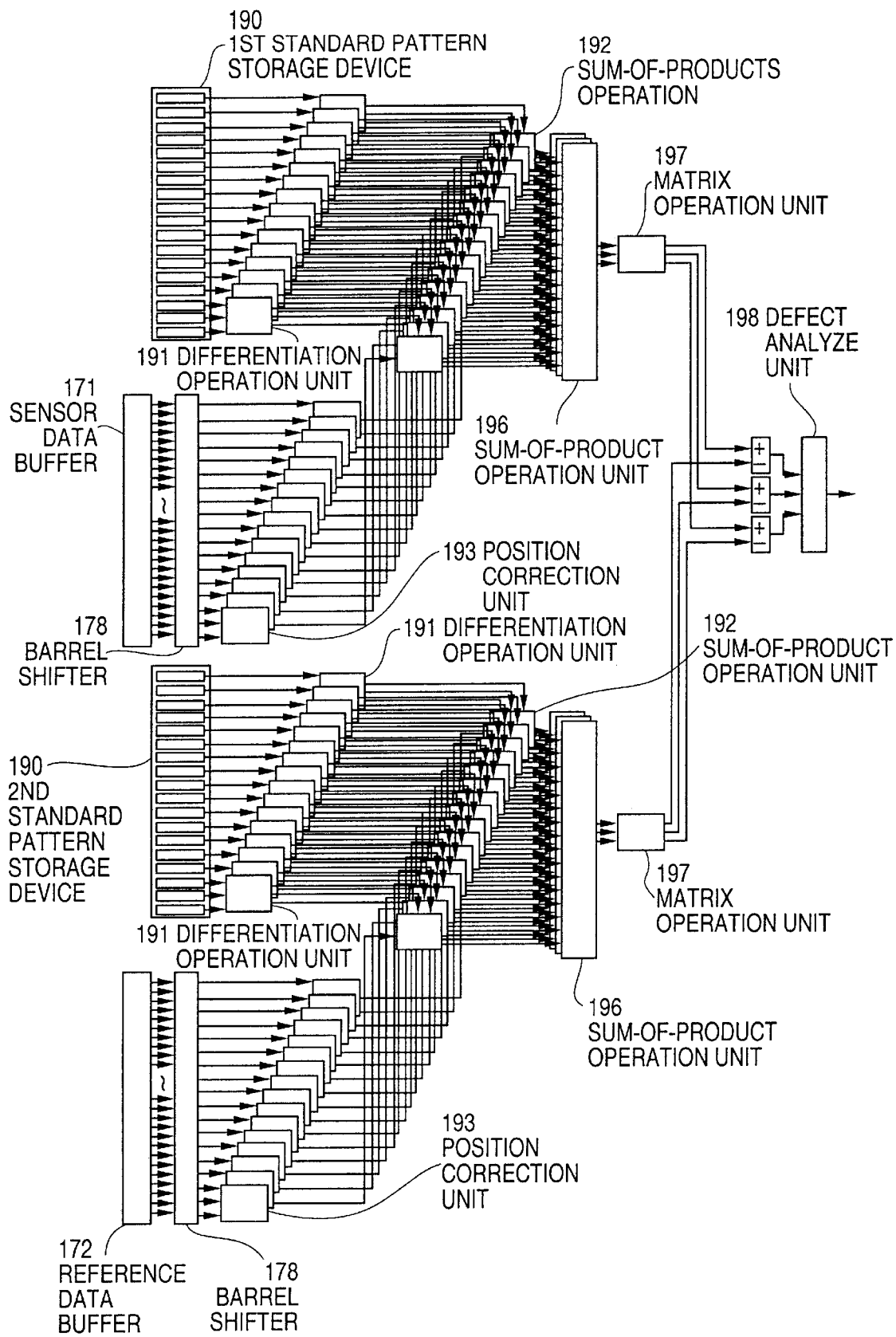
FIG. 17 is a diagram showing a second configuration example of the transmission error detecting section.

FIG. 17 shows a second configuration example of the transmission defect detector section. This circuit calculates the transmission error and displacement by replacing the direct calculation of the transmission error and relative displacement of the sensor data and reference data with an alternative procedure for calculation of the transmission error and displacement amount, including the steps of using the sensor data and first standard data to obtain a first transmission error and first relative displacement, using the reference data and second standard data to obtain a second transmission error and second relative displacement, and then obtaining respective differences therebetween. Here, the first standard data is selected from the sensor data whereas the second standard data is from the reference data.

More specifically, two sets of constituent components are provided each of which includes the components 190 to 197 shown in FIG. 14, wherein one set is for obtaining the first transmission error and first relative displacement based on the sensor data and the first standard data whereas the other set obtains from the reference data and second standard data the second transmission error and second relative displacement. And, obtaining respective differences between them enables the defect analyze unit 198 to obtain the intended transmission error and displacement amount.

Here, when the case the openings sections are contact holes, the processing required is as follows. Solve linear equation systems as represented by:

$$\epsilon 1 \cdot R1(x,y) + x'0 \cdot dR1/dx + y'0 \cdot dR1/dy = R1(x,y) \cdot S(x,y) \quad \text{(Eq. 44)}$$

where S(x,y) is the sensor data at least three independent coordinates (x,y), R1(x,y) is the first standard data, dR1/dx is the X direction differentiated value of the first standard data, and dR1/dy is the Y direction differential value of first standard data, with the first transmission error $\epsilon 1$ and first relative displacement x'0, y'0 being unknown quantities, further, solve linear equation systems given as:

$$\epsilon 2 \cdot R2(x,y) + x''0 \cdot dR2/dx + y''0 \cdot dR2/dy = R2(x,y) - U(x,y) \quad \text{(Eq. 45)}$$

where U(x,y) is the reference data, R2(x,y) is the second standard data, dR2/dx is the X direction differential value of the second standard data, and dR/dy is the Y direction differential value of second standard data, with the second transmission error $\epsilon 2$ and second relative displacement x'0, y'0 being unknown quantities; then, subtract the second transmission error from the first transmission error to obtain $\epsilon 1 - \epsilon 2$; and finally, subtract the second relative displacement from the first relative displacement to obtain (x'0−x''0, y'0−y''0).

Alternatively, where the openings are lines-and-spaces, the processing is as follows. Solve linear equation systems represented by:

$$\epsilon 1 \cdot R1(x,y) + l'0 \cdot dR1/dl = R1(x,y) - S(x,y) \quad \text{(Eq. 46)}$$

where S(x,y) is the sensor data at least two independent coordinates (x,y), R1(x,y) is the first standard data, and dR1/d1 is the differential value of the first standard data in a direction perpendicular to the lines-and-spaces, with the first transmission error $\epsilon 1$ and relative displacement l'0 in the direction normal to the lines-and-spaces being unknown quantities; further solve linear equation systems given as:

$$\epsilon 2 \cdot R2(x,y) + l''0 \cdot dR2/dl = R2(x,y) - U(x,y) \quad \text{(Eq. 47)}$$

where U(x,y) is the reference data, R2(x,y) is the second standard data, and dR2/d1 is the differential value of the second standard data in the direction perpendicular to the lines-and-spaces, with the second transmission error $\epsilon 2$ and second relative displacement l''0 in the direction normal to lines-and-spaces being unknown quantities; then, subtract the second transmission error from the first transmission error to obtain $\epsilon 1 - \epsilon 2$, and finally, subtract the second relative displacement from the first relative displacement to obtain (l'0−l''0).

The second configuration example shown in FIG. 17 is different from the first configuration example shown in FIG. 14 in that the former is capable of calculating the reference data's transmission error and relative displacement and canceling them out from the transmission error and relative displacement which are calculated from the sensor data; accordingly, the shape and size of a to-be-inspected pattern will no longer be limited, thereby making it possible to apply the second example to those having appropriate line widths corrected using the optical proximity effect correction.

As described above, according to this embodiment, it is no longer required to detect the position of a pattern edge or the like, which in turn makes it possible to detect at high speed any small defects like transmission defects and CD defects, which have been considered to be difficult to detect in the past.

Figure 18:
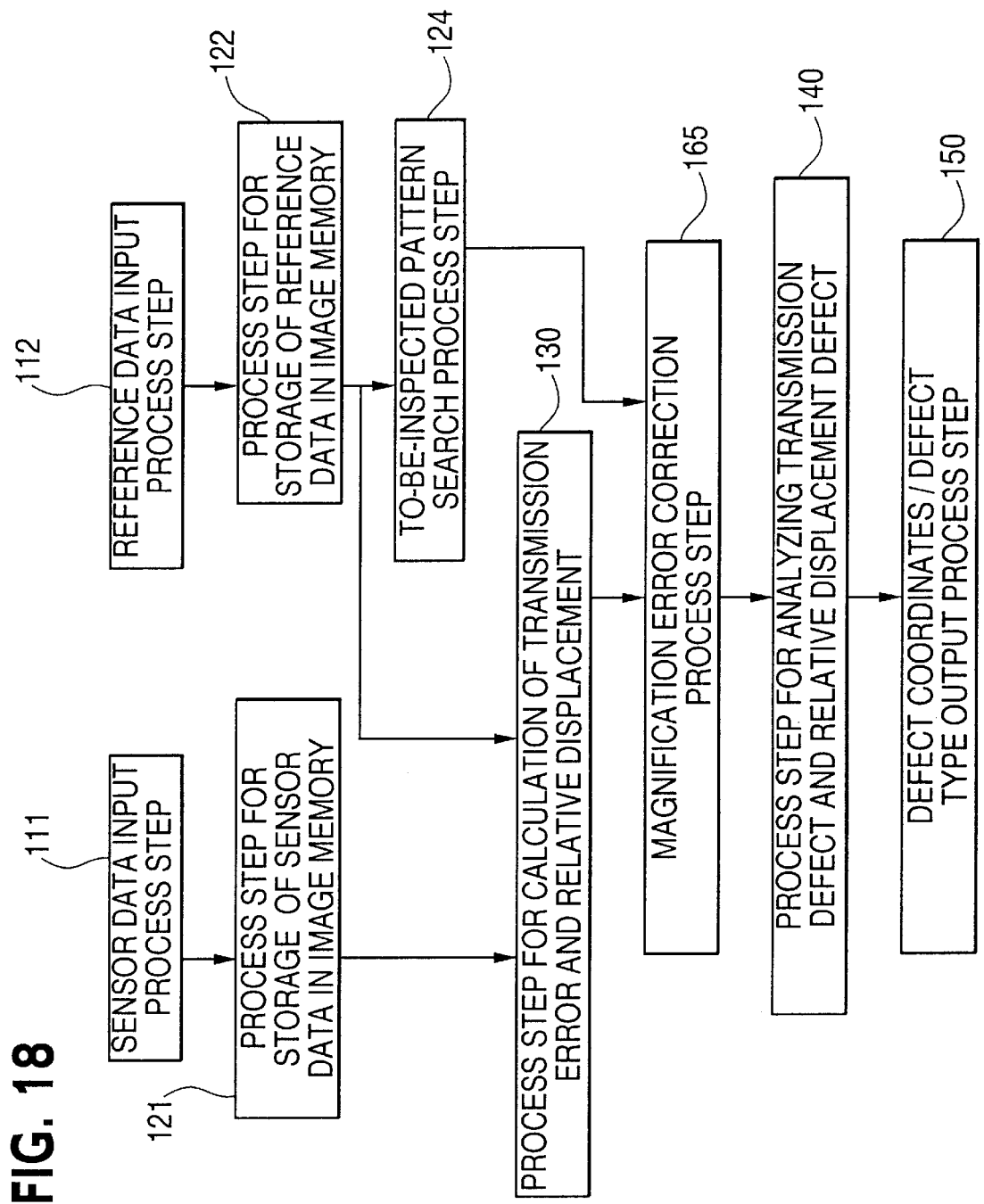
FIG. 18 is a diagram showing a basic operation of a defect inspection method in block form in accordance with a fourth embodiment.

FIG. 18 is a configuration example showing in block form the fundamental operation of a defect inspection method in accordance with a fourth embodiment of the present invention. Note that the same reference characters are used to designate the same parts or components as shown in FIG. 11 and FIG. 12, and a detailed explanation thereof will be omitted herein.

The present embodiment includes a process step 111 of inputting sensor data obtained by scanning a sample, process step 112 for inputting reference data corresponding to the sensor data, data storage process steps 121, 122 of storing these data items in an image memory, search process step 124 for searching for a pattern to be inspected based on the reference data as stored in the image memory, calculation process step 130 for calculation of a transmission error and relative displacement by extracting the reference data and sensor data in conformity with the shape and size of a two-dimensional pattern, correction process step 165 for correcting a magnification error of the sensor data, analyze/judgment process step 140 which analyzes, for assessment, transmission defects and relative displacement defects after correction of the magnification error of the sensor data, and output process 150 which outputs the defect coordinates and defect category.

Figure 19:
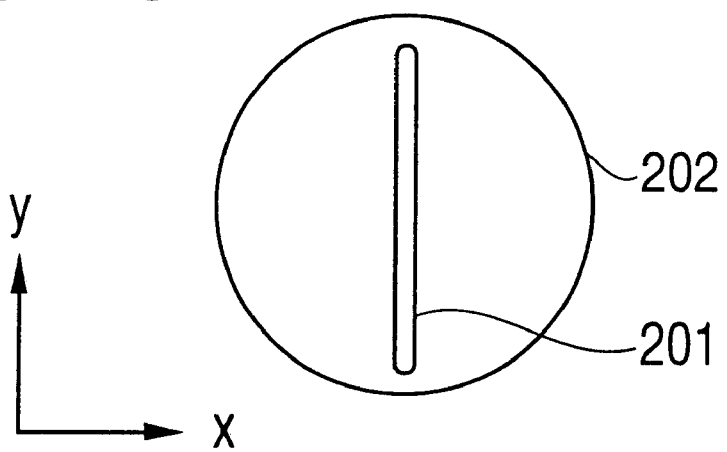
FIG. 19 is a diagram representing a line sensor along with the range of a view field.

The magnification error of the sensor data as used herein is due to an image distortion and a manufacturing error of sensing devices. As has been described previously, in order to inspect defects with high sensitivity, the procedures of canceling out of this magnification error during defect analysis is indispensable. As shown in FIG. 19, a line sensor 201 is arranged within an optical view field 202. Whereas the electrical scanning of the line sensor 201 is in the Y axis direction, the mechanical scanning direction of a sample is the Y axis direction. Generally, optical systems have the tendency that more image distortion occur in the periphery with respect to the center of the view field, which would result in an error in magnification being generated between an image sensed at the center of such line sensor and an image sensed near the opposite ends. In addition, the magnification error is determined only by the line sensor and the optical view field's position, thus, once the magnification error is obtained per each pixel, it will remain unchanged even when the inspection pattern or the like changes.

Therefore, a magnification error is pre-stored per each pixel of the line sensor 201. The magnification error is identified as the transmission error which is calculated from the sensor data and the reference data using a sample having two-dimensional patterns disposed at substantially equal intervals along the scan direction of the line sensor 201. The magnification error per each pixel of the line sensor is obtainable by internal insertion of the Y directional distribution of a plurality of transmission errors corresponding to the two-dimensional patterns disposed at equal intervals.

Here, the appropriate candidate for these two-dimensional patterns is, for example, an array of rectangular hole patterns disposed at approximately equal intervals. The alternative candidate is elongate rectangular holes or lines-and-spaces patterns in the X direction. Further, it is also desirable that a plurality of hole patterns are calculated to estimate magnification errors, and then get the average value of the transmission errors to exclude the effect of fabrication errors of the two-dimensional patterns.

Figure 20:
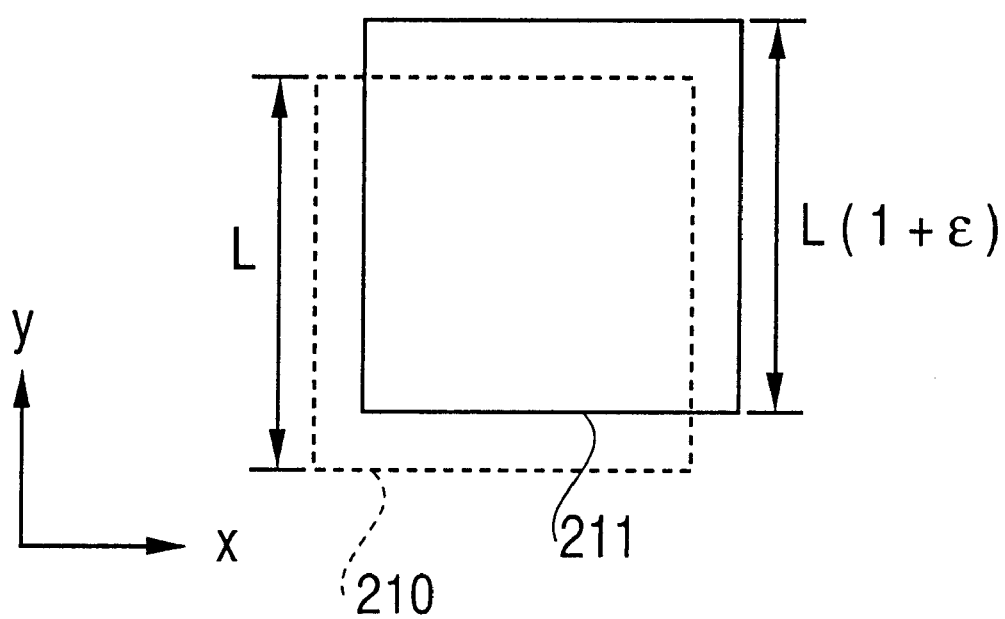
FIG. 20 is a diagram explaining a magnification error.

The process step 140 is provided for analyzing/judging presence or absence of a defect based on the magnitude of a value canceled out by the magnification error from the transmission error. The magnification error will be explained with reference to FIG. 20. Suppose the sensor data 211 is such that a magnification error F, is generated in the Y axis direction with respect to reference data 210. It will be seen that the size of the reference data is L whereas the sensor data has its size L(1+ε). Therefore, unless the magnification error is corrected, any high-sensitivity dimension inspection will become ineffectual. Since ε is obtainable, the magnification error may be obtained per pixel and stored. Such magnification error correction is to judge whether a defect is present or absent through canceling out of an image distortion with respect to the transmission error and relative displacement as well as the transmission error added with the to-be-inspected pattern searched, by inputting thereto a pattern position obtained as a result of searching for a to-be-inspected pattern and by subtraction of the magnification error of one or more pixels corresponding to the pattern position.

It should be noted that the present invention should not exclusively be limited to a respective one of the illustrative embodiments and may be modified into various forms without departing from the spirit and scope of the invention.

It has been described that according to the present invention, defects in patterns of contact holes or lines-and-spaces can be obtained by calculation, which in turn makes it possible to detect with high accuracy any defects on fine contact holes and lines-and-spaces which have been difficult to be detected in the prior technique. Consequently, it becomes possible to sufficiently accommodate the need for inspection of defects in patterns on samples such as photomasks, reticles, liquid crystal substrates and the like, which will be demanded to increase the microfabricability more and more in future; thus, the usability and applicability is great.

What is claimed is:

1. A defect inspection method for detecting defects of a pattern formed on a sample, comprising the steps of:

inputting an optical image of the sample as sensor data;

inputting reference data corresponding to the sensor data;

inputting inspection region data designating a plurality of inspection regions of the sample in conformity with the size and shape of the pattern, wherein a rectangular region including an opening section is input as the inspection region and the opening region is a contact hole;

calculating a first transmission error and a first relative displacement of the sensor data based on the reference data, including a step of solving an equation represented by:

$$\epsilon \cdot U(x,y) + x0 \cdot dU/dx + y0 \cdot dU/dy = U(x,y) - S(x,y)$$

where S(x,y) is the sensor data having at least two independent coordinates (x,y), U(x,y) is the reference data, dU/dx is an X direction differential value of the reference data, and dU/dY is a Y direction differential value of the reference data, with the transmission error ε and the relative displacement x0, y0 being unknown quantities;

performing position alignment of the sensor data and the reference data based on the calculated first relative displacement;

calculating a second transmission error and a second relative displacement using the aligned reference data and the aligned sensor data in the equation; and analyzing a defect of the sample from the second transmission error and the second displacement of the sensor data.

2. The defect inspection method according to claim 1, wherein the step of calculating the first transmission error and the first displacement of the sensor data includes a step of solving the equation using a least square method at those coordinates excluding an area of the rectangular region corresponding to the interior of a light shield section of the sample.

3. A defect inspection method for detecting defects of a pattern formed on a sample, comprising the steps of:

inputting an optical image of the sample as sensor data;

inputting reference data corresponding to the sensor data;

inputting inspection region data designating a plurality of inspection regions of the sample in conformity with the size and shape of the pattern, wherein a rectangular region including an opening section is input as the inspection region and the opening region has lines and spaces;

calculating a first transmission error and a first relative displacement of the sensor data based on the reference data, including a step of solving an equation represented by:

$$\epsilon \cdot U(x,y) + l0 \cdot dU/dl = U(x,y) - S(x,y)$$

where S(x,y) is the sensor data having at least two independent coordinates (x,y), U(x,y) is the reference data, and dU/dl is a differential value of the reference data in a direction perpendicular to said lines-and-spaces, with the transmission error ε and the relative displacement l0 being unknown quantities;

performing position alignment of the sensor data and the reference data based on the calculated first relative displacement;

calculating a second transmission error and a second relative displacement using the aligned reference data and the aligned sensor data in the equation; and analyzing a defect of the sample from the second transmission error and the second displacement of the sensor data.

4. The defect inspection method according to claim 3, wherein the step of calculating the first transmission error and the first displacement of the sensor data includes a step of solving the equation using a least square method at those coordinates excluding an area of the rectangular region corresponding to the interior of a light shield section of the sample.

* * * * *